US009715691B2

(12) United States Patent
Joao

(10) Patent No.: US 9,715,691 B2
(45) Date of Patent: *Jul. 25, 2017

(54) APPARATUS AND METHOD FOR PROVIDING TRANSACTION HISTORY INFORMATION, ACCOUNT HISTORY INFORMATION, AND/OR CHARGE-BACK INFORMATION

(75) Inventor: Raymond Anthony Joao, Yonkers, NY (US)

(73) Assignee: GTJ VENTURES, LLC, Yonkers, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/802,973

(22) Filed: Jun. 17, 2010

(65) Prior Publication Data
US 2010/0274723 A1    Oct. 28, 2010

Related U.S. Application Data

(63) Continuation-in-part of application No. 12/657,764, filed on Jan. 27, 2010, which is a continuation-in-part of application No. 12/283,838, filed on Sep. 16, 2008, now Pat. No. 7,661,585, which is a continuation of
(Continued)

(51) Int. Cl.
| | |
|---|---|
| *G06F 7/00* | (2006.01) |
| *G06F 15/16* | (2006.01) |
| *G06Q 20/40* | (2012.01) |
| *G06Q 20/04* | (2012.01) |
| *G06Q 20/12* | (2012.01) |

(Continued)

(52) U.S. Cl.
CPC ........ *G06Q 20/4016* (2013.01); *G06Q 20/04* (2013.01); *G06Q 20/12* (2013.01); *G06Q 20/40* (2013.01); *G06Q 30/06* (2013.01); *G06Q 40/02* (2013.01)

(58) Field of Classification Search
CPC ...... G06Q 10/087; G06Q 40/00; G06Q 20/40; G07F 7/1008
USPC ......... 705/30, 35, 28, 34, 44, 26.1; 235/376, 235/379, 380, 383, 385; 709/217, 223, 709/229, 204
See application file for complete search history.

(56) References Cited

U.S. PATENT DOCUMENTS

| | | | | |
|---|---|---|---|---|
| 6,185,576 | B1 * | 2/2001 | McIntosh | |
| 7,529,698 | B2 * | 5/2009 | Joao | ............................ 705/30 |
| 7,599,853 | B2 * | 10/2009 | Matsumoto et al. | ...... 705/14.69 |

(Continued)

*Primary Examiner* — Andrew Joseph Rudy
(74) *Attorney, Agent, or Firm* — Raymond A. Joao, Esq.

(57) ABSTRACT

A computer-implemented method, including processing, with a processing device, information regarding an account involved in a transaction involving an individual, wherein the information regarding the account is received by a receiver, and further wherein the information regarding the account is processed prior to a processing, a completion, a consummation, or a cancellation, of the transaction, generating, with the processing device, a report or a message in response to the processing of the information regarding the account, wherein the report or the message contains information regarding a charge-back regarding a previous transaction involving the account, and transmitting, with or from a transmitter, the report or the message to a communication device associated with a merchant, vendor, or provider, of a good, product, or service.

23 Claims, 9 Drawing Sheets

Related U.S. Application Data application No. 10/045,080, filed on Jan. 15, 2002, now Pat. No. 7,529,698.

(60) Provisional application No. 60/262,167, filed on Jan. 16, 2001.

(51) Int. Cl.
*G06Q 30/06* (2012.01)
*G06Q 40/02* (2012.01)

(56) References Cited

U.S. PATENT DOCUMENTS

| | | |
|---|---|---|
| 7,661,585 B2 * | 2/2010 | Joao ............................. 235/379 |
| 8,024,238 B2 * | 9/2011 | Vasten ............................ 705/30 |
| 8,069,256 B2 * | 11/2011 | Rasti ............................ 709/229 |
| 8,170,928 B2 * | 5/2012 | Knowles et al. ............... 705/28 |
| 8,204,824 B2 * | 6/2012 | Knowles et al. ............... 705/38 |
| 8,428,332 B1 * | 4/2013 | Csulits .................... G07F 19/20 235/379 |
| 8,437,528 B1 * | 5/2013 | Csulits et al. ................ 382/135 |
| 8,655,046 B1 * | 2/2014 | Csulits et al. ................ 382/135 |
| 8,706,577 B2 * | 4/2014 | Stringfellow et al. .......... 705/30 |
| 8,944,234 B1 * | 2/2015 | Csulits .................. G07D 7/004 194/206 |

\* cited by examiner

APPARATUS AND METHOD FOR PROVIDING TRANSACTION HISTORY INFORMATION, ACCOUNT HISTORY INFORMATION, AND/OR CHARGE-BACK INFORMATION

RELATED APPLICATIONS

This application is a continuation-in-part application of U.S. patent application Ser. No. 12/657,764, filed Jan. 27, 2010, and entitled "APPARATUS AND METHOD FOR PROVIDING TRANSACTION HISTORY INFORMATION, ACCOUNT HISTORY INFORMATION, AND/OR CHARGE-BACK INFORMATION", which application is a continuation-in-part application of U.S. patent application Ser. No. 12/283,838, filed Sep. 16, 2008, and entitled "APPARATUS AND METHOD FOR PROVIDING TRANSACTION HISTORY INFORMATION, ACCOUNT HISTORY INFORMATION, AND/OR CHARGE-BACK INFORMATION", now U.S. Pat. No. 7,661,585, which application is a continuation application of U.S. patent application Ser. No. 10/045,080, filed Jan. 15, 2002, and entitled "APPARATUS AND METHOD FOR PROVIDING TRANSACTION HISTORY INFORMATION, ACCOUNT HISTORY INFORMATION, AND/OR CHARGE-BACK INFORMATION", now U.S. Pat. No. 7,529,698, the subject matter of which applications is hereby incorporated by reference herein. U.S. patent application Ser. No. 10/045,080, now U.S. Pat. No. 7,529,698, claims the benefit of priority of U.S. Provisional Patent Application Ser. No. 60/262,167, filed Jan. 16, 2001, and entitled "APPARATUS AND METHOD FOR PROVIDING TRANSACTION HISTORY INFORMATION, ACCOUNT HISTORY INFORMATION, AND/OR CHARGE-BACK INFORMATION", the subject matter of which is hereby incorporated by reference herein.

FIELD OF THE INVENTION

The present invention pertains to an apparatus and method for providing transaction history information, account history information, and/or charge-back information and, in particular, to an apparatus and method for providing transaction history information, account history information, and/or charge-back information, or individual information, which can be utilized by an individual, entity, merchant, vendor, or provider, in processing a transaction in order to prevent and/or in order to reduce the incidence of any one or more of credit card fraud, credit account fraud, charge card fraud, charge account fraud, debit card fraud, debit account fraud, and/or cyber-shoplifting, and/or in order to prevent and/or in order to reduce the incidence of fraud or fraudulent activities occurring, or which have occurred, in, on, or in connection with a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

BACKGROUND OF THE INVENTION

Merchants, vendors, or providers, of goods, products, or services, lose millions of dollars each year as the result of non-payment of their receivables. Non-payment of receivables can result from credit card fraud, charge card fraud, debit card fraud, cyber-shoplifting, charge-backs, bank fraud, check fraud, the stopping of issued checks, checks returned for insufficient funds, and other causes or activities.

Merchants, vendors, or providers, of goods, services, or products, have long experienced credit card fraud, charge card fraud, debit card fraud, cyber-shoplifting (such as when individuals deny making an on-line or non-face-to-face transaction involving credit cards, charge cards, debit cards, or any other advancement of credit), charge-backs (which occur when a credit, charge, or debt, services issuing entity or bank forces the merchant, vendor, or provider, to pay back funds paid thereto along with possibly imposing charge-back fees), bank fraud, check fraud, the stopping of issued checks, checks returned for insufficient funds, and other activities.

With the tremendous increase in telephone-based transactions as well as on-line transactions, such as those occurring on, or over, the Internet and/or the World Wide Web, risks of non-payment have become even greater. These non-payment risks have resulted from the non-face-to-face nature of telephone or on-line transactions which involve credit cards, charge cards, debit cards, or their respective accounts, which do not allow merchants, vendors, or providers, the opportunity to verify and/or otherwise ensure that they are entering into transactions with the true account holder or account owner.

As a result, many merchants, vendors, or providers, are having their charges or receivables challenged, disputed, and/or denied, by dishonest individuals. This has resulted in charge-backs to the merchants, vendors, or providers, which entail having a bank or issuer associated with the account holder's or the account owner's account impose a return of funds. Other fees may also be imposed on the respective merchants, vendors, or providers.

As a result, the respective merchants, vendors, or providers, can lose in a number of ways. They lose the funds received, they may not have the goods, products, or services, returned, they may be charged charge-back fees, and/or they can experience opportunity costs (i.e. expended employee time and/or company resources) in dealing with the disputed charges.

Activities by dishonest individuals, in ordering a good, product, or service, only to later deny making the order or deny entering into the transaction, so as to avoid payment, while not returning the respective goods, products, or services, has come to be known as "cyber-shoplifting" and can cost merchants, vendors, or providers, millions of dollars annually. Losses which result from these and other forms of credit card fraud, charge card fraud, debit card fraud, bank fraud, check fraud, the stopping of issued checks, checks returned for insufficient funds, and other activities result in even greater losses to merchants, vendors, or providers.

Losses to merchants, vendors, providers, any of their banks, any of their respective vendors or providers, and/or any of their insurers, if applicable, in the long run, can ultimately get passed on to, and can be shared by, all of us.

No system or method exists which can provide the means for allowing merchants, vendors, or providers, to protect themselves from losses or risks of losses which can result from credit card fraud, charge card fraud, debit card fraud, cyber-shoplifting, charge-backs, bank fraud, check fraud, the stopping of issued checks, checks returned for insufficient funds, and other activities.

SUMMARY OF THE PRESENT INVENTION

The present invention pertains to an apparatus and method for providing transaction history information, account history information, and/or charge-back information, or individual information, which overcomes the shortfalls of the prior art.

The present invention provides an apparatus and method for providing transaction history information, account history information, and/or charge-back information, or individual information, which can be utilized by an individual, entity, merchant, vendor, provider, or other entity, in processing, and/or in assessing the processing of, a transaction in order to prevent and/or in order to reduce the incidence of any one or more of credit card fraud, credit account fraud, charge card fraud, charge account fraud, debit card fraud, debit account fraud, check fraud, checking account fraud, and/or cyber-shoplifting, and/or in order to prevent and/or in order to reduce the incidence of fraud or fraudulent activities occurring, or which have occurred, in, on, or in connection with, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

The present invention can be utilized in order to process information regarding fraudulent use of any one or more of credit cards, credit accounts, charge cards, charge accounts, debit cards, debit accounts, electronic money accounts, checks, or checking accounts. The present invention can also be utilized in order to process information regarding checks returned due to insufficient funds, checks for which stop payment orders have been made, disputes and/or denial of payment assertions made in conjunction with any one or more of credit cards, credit accounts, charge cards, charge accounts, debit cards, debit accounts, electronic money accounts, checks, or checking accounts. The present invention can also be utilized in order to process information regarding fraudulent use of, or fraudulent activity regarding, any one or more of bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated with or corresponding thereto, or any other policy, plan, or program, and/or other accounts.

The present invention can also process information regarding past denials of liability or responsibility regarding a transaction, past charge-back activity involving any one or more of a credit card, a credit account, a charge card, a charge account, a debit card, a debit account, a checking account, a bank account, an automated teller machine account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to, any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, Or program.

The information obtained from the present invention can be utilized by an individual, entity, merchant, a vendor, provider, and/or any other entity, in order to process a transaction, and/or in order to assess whether or not it should provide a service, good, or product, or fulfill an order relating to a transaction.

The present invention can be utilized in order to perform risk management in transactions involving payment by any or more of credit cards, credit accounts, charge cards, charge accounts, debit cards, debit accounts, electronic money accounts, checks, or checking accounts, in order to perform risk management in transactions involving bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other types or kinds of accounts. The present invention can also be utilized in face-to-face transactions, non-face-to-face transactions, telephone transactions, on-line transactions, mail order transactions, and/or in any other non-cash transactions.

The present invention can be utilized in order to provide information at any time during, prior to, and/or subsequent to, a transaction. The present invention can also be utilized by an individual, entity, merchant, vendor, provider, or other entity, in order to assess an individual's or an entity's past transaction history, account history, or charge-back history, or individual information, in order to determine if the individual or entity has had a history of, or could be a risk in, denying being party to a transaction involving a credit card, a credit account, a charge card, a charge account, a debit card, a debit account, a checking account, a bank account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, disputing a transaction involving a credit card, a credit account, a charge card, a charge account, a debit card, a debit account, or any of the other herein-described accounts, passing or attempting to pass a bad check, stopping payment of an issued check, and/or in other ways attempting to defraud or otherwise obtain goods, products, or services, without paying for same, shopping same, or shoplifting same, and/or cyber-shoplifting same.

The present invention can be utilized in order to allow an individual, entity, merchant, vendor, or provider, of goods, products, and/or services, to process information regarding a counterpart or counterparty to a transaction in order to determine if the counterpart or counterparty could be a risk, could be a credit risk, or might not fulfill payment obligations relating to a transaction.

The present invention can provide transaction history information, account history information, and/or charge-back information, or individual information, any one or more of during a transaction, during a transaction authorization process, subsequent to a transaction, subsequent to a transaction authorization process, prior to an order fulfillment process, prior to providing a service, and/or during an order fulfillment process.

The present invention can also process information received, concerning any of the herein-described individuals or entities, from any one of more of credit card issuers, credit account administrators, charge card issuers, charge account administrators, debit card issuers, debit account administrators, electronic money account administrators, checking account administrators, and/or any banks and/or financial institutions or insurances companies, goods providers or service providers, and/or other entities which facilitate, manage, operate, and/or administer, any of the herein-described accounts.

The present invention can process information received, concerning any individuals or entities, from any merchants, vendors, and/or providers of goods, products, and/or services, credit agencies, and/or any other individual, individuals, entity, and/or entities.

The apparatus includes a central processing computer which can perform any of the herein-described processing routines and/or processing operations, as well as any of the communication operations described herein as being provided by the present invention.

The central processing computer can service any number of individuals, entities, merchants, vendors, and/or providers, and/or any of the accounts with any of the individuals, account holders, and/or account owners, associated with any of the herein-described accounts.

The apparatus can also include one or more merchant communication devices or computers which can be associated with any of the herein-described individuals, entities, merchants, vendors, and/or providers, who or which utilize the present invention.

The apparatus can also include one or more information provider communication devices or computers. The information provider computer can be associated with a credit card issuer, a credit account administrator, a charge card issuer, a charge account administrator, a debit card issuer, a debit account administrator, an electronic money account administrator, a checking account administrator, a bank, a financial institution, or any entity which facilitates, manages, operates, and/or administers, any of the herein-described accounts, a merchant, a vendor, a provider, a credit rating agency or service, governmental or other entities or agencies, and/or any other entity which can provide information regarding any transaction history information, account history information, and/or charge-back information, and/or any information related thereto, or individual information, for, or regarding, any of the individuals or entities described herein as engaging in transactions with any of the herein-described individuals, entities, merchants, vendors, and/or providers.

Any number of central processing computers, merchant computers, and/or information provider computers, can be utilized in conjunction with the present invention.

The central processing computers, the merchant computers, and/or the information provider computers, can communicate with, transmit information to, and/or receive information from, any other central processing computers, merchant computers, and/or information provider computers, over any suitable communication network or system, including, but not limited to a telephone network, a telecommunication network, a digital communication network, a satellite communication network, a wireless communication network, a personal communication services network, a broadband communication network, a bluetooth communication network, the Internet, the World Wide Web, and/or any other communication network and/or system.

The present invention can be utilized on, over, and/or in conjunction with, any suitable communication network or system, including, but not limited to a telephone network, a telecommunication network, a digital communication network, a satellite communication network, a wireless communication network, a personal communication services network, a broadband communication network, a bluetooth communication network, the Internet, the World Wide Web, and/or any other communication network and/or system.

The present invention can be utilized in order to provide information to an individual, entity, merchant, vendor, or provider, regarding charge-backs, stopping of payments, and/or failures to make payments, which have occurred on or in connection with an account of an individual or entity with whom the respective individual, entity, merchant, vendor, or provider, is currently engaging in a transaction. The present invention can provide detailed information to the individual, entity, merchant, vendor, or provider, regarding the transaction and subsequent activities.

The present invention can also be utilized in order to determine whether an individual paying for a transaction by check has previously stopped payment of a check in a previous transaction. The present invention can also provide information regarding the transaction and subsequent activities. The present invention can also be utilized in order to determine whether an individual paying for a transaction with a check has previously had a check returned due to insufficient funds and/or "bounced" a check.

The present invention can also process and/or provide information regarding unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, an individual, for any number of individuals.

The present invention can also be utilized to provide information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, an individual, for any number of individuals. The apparatus and method of the present invention can also process and/or provide information regarding a judgment(s) issued against or involving, a judgment(s) satisfied involving, or an unsatisfied judgment(s) involving, an individual, for, of, associated with, or regarding, an individual or any number of individuals.

The apparatus and method of the present invention can also process and/or provide any other information regarding an individual, for any number of individuals, which may be deemed of interest to a merchant, vendor, or provider, of goods, products, and/or services, to process information regarding a counterpart or counterparty to a transaction in order to determine if an individual could be a risk, could be a credit risk, or might not fulfill payment obligations, relating to a transaction.

The present invention can also be utilized in order to provide transaction history information, account history information, and/or charge-back information, or individual information, including the above-described charge-back, check stopping of payment, or check bouncing, information, during a transaction authorization process, prior to a transaction authorization process, subsequent to transaction authorization process, prior to a service being provided, and/or prior to a goods, products, and/or services, shipment and/or delivery.

The present invention can be utilized in order to provide information to an individual, entity, merchant, vendor, or provider, regarding a charge-back(s), a stopping of payment(s), and/or a non-payment(s) due to insufficient funds, which have occurred on, in conjunction with, and/or relating to, any of the herein-described accounts.

The merchant can then utilize the report information in order to determine either not to proceed with the transaction, to cancel the transaction or order, to request additional information, to request information to confirm and/or verify the transaction and the account holder's or the account owner's authority to enter into the transaction, to request additional assurances from the account holder or account owner, to secure the account holder's or the account owner's agreement not to dispute a charge or payment, to secure the account holder's or the account owner's agreement not to stop payment for a charge or payment, to secure the account holder's or the account owner's guarantee that sufficient funds exist to cover a payment, to secure the account holder's or the account owner's alternate agreement to guarantee payment for a charge, to secure a release of liability or claim from the account holder or account owner regarding the transaction, and/or the merchant can take any other action in order to protect its interests.

The present invention can be utilized in order to provide respective charge-back information, stopping of payment information, and/or non-payment due to insufficient funds information, or information regarding fraudulent activity, to an individual, entity, merchant, vendor, or provider, at any time prior to the individual's, the entity's, the merchant's, the vendor's, or the provider's, delivery, transfer, or shipment, of the respective goods, products, and/or services, or the providing of a service, to an individual, entity, account holder, or account owner.

The present inventions can also be utilized in a same, a similar, and/or in an analogous, manner in order to provide any of the herein-described account information or account-related information, including, but not limited to, charge-back information, stopping of payment information, and/or non-payment due to insufficient funds information, or information regarding fraudulent activity, regarding any of the herein-described accounts.

The present invention can also be utilized in conjunction with, and/or along with, a transaction authorization process.

The present invention can also be utilized to provide information regarding an individual, currently engaging in a transaction or otherwise, to a merchant, vendor, or provider.

Intelligent agents, software agents, mobile agents, and/or related technologies, can also be utilized in conjunction with the present invention. The respective intelligent agent(s), software agent(s), mobile agent(s), can be programmed and/or designed to act on behalf of any of the respective individuals, entities, merchants, vendors, or providers, described herein as utilizing the present invention, so as to act on behalf of the respective individuals, entities, merchants, vendors, or providers, as well as to perform any of the processing functions and/or other functions described herein.

The apparatus of the present invention can also be programmed to automatically generate, and/or to automatically transmit to a computer associated with, or used by, a merchant, vendor, or provider, or any other individual or entity, a new or updated charge-back information report or new or updated charge-back information reports, within a pre-defined time limit or time period, upon detecting or determining that new information, previously unavailable information, or missing information, is, or has been made, available. In this regard, the present invention can provide one or more new or updated charge-back information reports within or during the pre-defined time limit or time period, or prior to or before a date and/or time for a providing, a shipping, a transferring, and/or a delivery, of a good(s), product(s), or service(s).

The apparatus of the present invention can also be programmed to automatically generate, and/or to automatically transmit to a computer associated with, or used by, a merchant, vendor, or provider, or any other individual or entity, a new or updated stopping of payment(s) information report or a new or updated non-payment(s) due to insufficient funds information report, or new or updated stopping of payment(s) information reports or new or updated non-payment(s) due to insufficient funds information reports, within a pre-defined time limit or time period, upon detecting or determining that new information, previously unavailable information, or missing information, is, or has been made, available. In this regard, the present invention can provide one or more new or updated stopping of payment(s) information reports or one or more new or updated non-payment(s) due to insufficient funds information reports, within or during the pre-defined time limit or time period, or prior to or before a date and/or time for a providing, a shipping, a transferring, and/or a delivery, of a good(s), product(s), or service(s).

The apparatus of the present invention can also be programmed to automatically generate, and/or to automatically transmit to a computer associated with, or used by, a merchant, vendor, or provider, or any other individual or entity, a new or updated information report, containing any of the information herein-described as being provided by the present invention, within a pre-defined time limit or time period, upon detecting or determining that new information, previously unavailable information, or missing information, is, or has been made, available. In this regard, the present invention can provide one or more new or updated information reports, within or during the pre-defined time limit or time period, or prior to or before a date and/or time for a providing, a shipping, a transferring, and/or a delivery, of a good(s), product(s), or service(s).

The present invention can also be programmed to be self-activating and/or activated automatically.

Accordingly, it is an object of the present invention to provide an apparatus and method for providing transaction history information, account history information, and/or charge-back information, or individual information, or any of the other herein-described information.

It is another object of the present invention to provide an apparatus and method for providing transaction history information, account history information, and/or charge-back information, or individual information, or any of the other herein-described information, which can be utilized by an individual, entity, merchant, vendor, provider, or other entity, in processing, and/or in assessing the processing of, a transaction.

It is still another object of the present invention to provide an apparatus and method for providing transaction history information, account history information, and/or charge-back information, or individual information, or information regarding fraudulent activity, or any other information described herein, which can be utilized by an individual, entity, merchant, vendor, provider, or other entity, in engaging in, in processing, and/or in assessing the processing of, a transaction involving a credit card account, a credit account, a charge card account, a charge account, a debit card account, a debit account, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, and/or other type or kind of account or accounts.

It is another object of the present invention to provide an apparatus and method for providing transaction history information, account history information, and/or chargeback information, or individual information, or information regarding fraudulent activity, which can be utilized by an individual, entity, merchant, vendor, provider, or other entity, in processing, and/or in assessing the processing of, a transaction involving a credit card account, a credit account, a charge card account, a charge account, a debit card account, a debit account, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, and/or other account or accounts.

It is still another object of the present invention to provide an apparatus and method for providing transaction history information, account history information, and/or chargeback information, or individual information, which can be utilized in order to prevent and/or in order to reduce the incidence of any one or more of credit card fraud, credit account fraud, charge card fraud, charge account fraud, debit card fraud, debit account fraud, check fraud, checking account fraud, or cyber-shoplifting, or fraud or fraudulent activity regarding or involving a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, and/or other account or accounts.

It is yet another object of the present invention to provide an apparatus and method for providing transaction history information, account history information, and/or chargeback information, or individual information, which can be utilized in order to process information regarding fraudulent use of any one or more of credit cards, credit accounts, charge cards, charge accounts, debit cards, debit accounts, electronic money accounts, automated teller machines, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

It is another object of the present invention to provide an apparatus and method for providing transaction history information, account history information, and/or chargeback information, or individual information, which can be utilized in order to process information regarding checks returned due to insufficient funds and checks for which stop payment orders have been made or placed.

It is still another object of the present invention to provide an apparatus and method for providing transaction history information, account history information, and/or chargeback information, or individual information, which can be utilized to process information regarding disputes and/or denial of payment assertions made in conjunction with any one or more of credit cards, credit accounts, charge cards, charge accounts, debit cards, debit accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

It is yet another object of the present invention to provide an apparatus and method for providing transaction history information, account history information, and/or chargeback information, or individual information, which can be utilized in order to process information regarding past denials of liability or responsibility regarding a transaction.

It is another object of the present invention to provide an apparatus and method for providing transaction history information, account history information, and/or chargeback information, or individual information, which can be utilized in order to perform risk management assessments regarding a transaction.

It is still another object of the present invention to provide an apparatus and method for providing transaction history information, account history information, and/or chargeback information, or individual information, which can be utilized in face-to-face transactions, non-face-to-face transactions, telephone transactions, on-line transactions, mail order transactions, or in any other transactions.

It is yet another object of the present invention to provide an apparatus and method for providing transaction history information, account history information, and/or chargeback information, or individual information, which can provide information at any time during, prior to, and/or subsequent to, a transaction.

It is another object of the present invention to provide an apparatus and method for providing transaction history information, account history information, and/or chargeback information, or individual information, which can be utilized to allow an individual, entity, merchant, vendor, or provider, of goods, products, and/or services, to process information regarding a counterpart or counterparty to a transaction in order to determine if the counterpart or counterparty could be a risk, could be a credit risk, or might not fulfill payment obligations relating to a transaction.

It is still another object of the present invention to provide an apparatus and method for providing transaction history information, account history information, and/or chargeback information, or individual information, which can be utilized during a transaction, during a transaction authorization process, subsequent to a transaction, subsequent to a transaction authorization process, prior to a providing of a service, prior to an order fulfillment process, or during an order fulfillment process.

It is yet another object of the present invention to provide an apparatus and method for providing transaction history information, account history information, and/or chargeback information, or individual information, which can be utilized on, over, or on or in conjunction with, any communication network or system.

It is another object of the present invention to provide an apparatus and method for providing transaction history information, account history information, and/or chargeback information, or individual information, which can be utilized on, over, or in conjunction with, any one or more of a telephone network, a telecommunication network, a digital communication network, a satellite communication network, a wireless communication network, a personal communication services network, a broadband communication network, or a bluetooth communication network.

It is still another object of the present invention to provide an apparatus and method for providing transaction history information, account history information, and/or chargeback information, or individual information, which can be utilized on, over, or in conjunction with, the Internet and/or the World Wide Web.

It is yet another object of the present invention to provide an apparatus and method for providing transaction history information, account history information, and/or chargeback information, or individual information, which can be utilized on, over, or in conjunction with, a wireless communication network.

It is another object of the present invention to provide an apparatus and method for providing transaction history information, account history information, and/or charge-back information, or individual information, which can be utilized in order to provide information to an individual, entity, merchant, vendor, or provider, regarding chargebacks, stopping of payments, and/or failures to make payments, which have occurred in or on an account of an individual or entity.

It is still another object of the present invention to provide an apparatus and method for providing transaction history information, account history information, and/or charge-back information, or individual information, which can provide detailed information to an individual, entity, merchant, vendor, or provider, regarding an account, an account transaction, or subsequent activities.

It is yet another object of the present invention to provide an apparatus and method for providing transaction history information, account history information, and/or charge-back information, or individual information, which can be utilized in order to provide transaction history information, account history information, and/or charge-back information, or individual information, during a transaction authorization process, prior to a transaction authorization process, subsequent to a transaction authorization process, or prior to a goods, products, and/or services, shipment or delivery, or prior to a providing of a service.

It is another object of the present invention to provide an apparatus and method for providing transaction history information, account history information, and/or charge-back information, or individual information, which can utilize intelligent agents, software agents, or mobile agents.

It is still another object of the present invention to provide an apparatus and method for providing transaction history information, account history information, and/or charge-back information, or individual information, which can be programmed to be self-activating or activated automatically.

It is yet another object of the present invention to provide an apparatus and method for providing information regarding unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, an individual, for any number of individuals.

It is another object of the present invention to provide an apparatus and method for providing information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, an individual, for any number of individuals, or information regarding a judgment(s) issued against or involving, a judgment(s) satisfied involving, or an unsatisfied judgment(s) involving, an individual, for, of, associated with, or regarding, an individual or any number of individuals.

It is still another object of the present invention to provide an apparatus and method for providing any of the herein-described information or other information regarding an individual, for any number of individuals, which may be deemed of interest to an individual, entity, merchant, vendor, or provider, of goods, products, and/or services, in order to allow the respective individual, entity, merchant, vendor, or provider to process information regarding a counterpart or counterparty to a transaction in order to determine if an individual could be a risk, could be a risk of loss risk, could be a credit risk, or might not fulfill payment obligations, relating to a transaction.

It is yet another object of the present invention to provide an apparatus and method for providing information regarding an individual, currently engaging in a transaction or otherwise, to an individual, entity, merchant, vendor, or provider.

It is another object of the present invention to provide an apparatus and a method for providing transaction history information, account history information, and/or charge-back information, or individual information, or any of the herein-described information, to any of the herein-described individuals, entities, merchants, vendors, or providers.

It is still another object of the present invention to provide an apparatus and a method for providing transaction history information, account history information, and/or charge-back information, or individual information, or any of the herein-described information, regarding an individual, an account holder, an account owner, or any other person or entity, or an account, policy, plan, or program, involved in a transaction, to any of the herein-described individuals, entities, merchants, vendors, or providers.

It is yet another object of the present invention to provide an apparatus and a method for providing transaction history information, account history information, and/or charge-back information, or individual information, or any of the herein-described information, regarding any of the herein-described accounts, policies, plans, or programs, involved in a transaction, to any of the herein-described individuals, entities, merchants, vendors, or providers.

It is another object of the present invention to provide an apparatus and method for providing a wide variety of information regarding an individual, an account holder, an account owner, or any other person or entity, involved in a transaction, to a respective individual, entity, merchant, vendor, or provider, of a good, a product, or a service.

It is still another object of the present invention to provide an apparatus and method for providing a wide variety of information regarding an account, policy, plan, or program, utilized or involved in a transaction, to a respective individual, entity, merchant, vendor, or provider, of a good, a product, or a service.

It is yet another object of the present invention to provide an apparatus and a method for providing any of the herein-described information regarding any of the herein-described accounts, policies, plans, or programs, or for providing any of the herein-described information regarding an individual or individuals, to any of the herein-described individuals, entities, merchants, vendors, or providers.

It is another object of the present invention to provide an apparatus and a method for providing any of the herein-described information which can provide one or more new or updated charge-back information reports within or during a pre-defined time limit or time period, or prior to or before a date and/or time for a providing, a shipping, a transferring, and/or a delivery, of a good(s), product(s), or service(s).

It is still another object of the present invention to provide an apparatus and a method for providing any of the herein-described information which can provide one or more new or updated stopping of payment(s) information reports or one or more new or updated non-payment(s) due to insufficient funds information reports, within or during a pre-defined time limit or time period, or prior to or before a date and/or time for a providing, a shipping, a transferring, and/or a delivery, of a good(s), product(s), or service(s).

It is yet another object of the present invention to provide an apparatus and a method for providing any of the herein-described information which can provide one or more new or updated information reports, which can contain any of the information herein-described as being capable of being provided by the present invention, within or during a pre-defined time limit or time period, or prior to or before a date and/or time for a providing, a shipping, a transferring, and/or a delivery, of a good(s), product(s), or service(s).

Other objects and advantages of the present invention will be apparent to those skilled in the art upon a review of the Description of the Preferred Embodiments taken in conjunction with the Drawings which follow.

DESCRIPTION OF THE PREFERRED EMBODIMENTS

Figure 1:
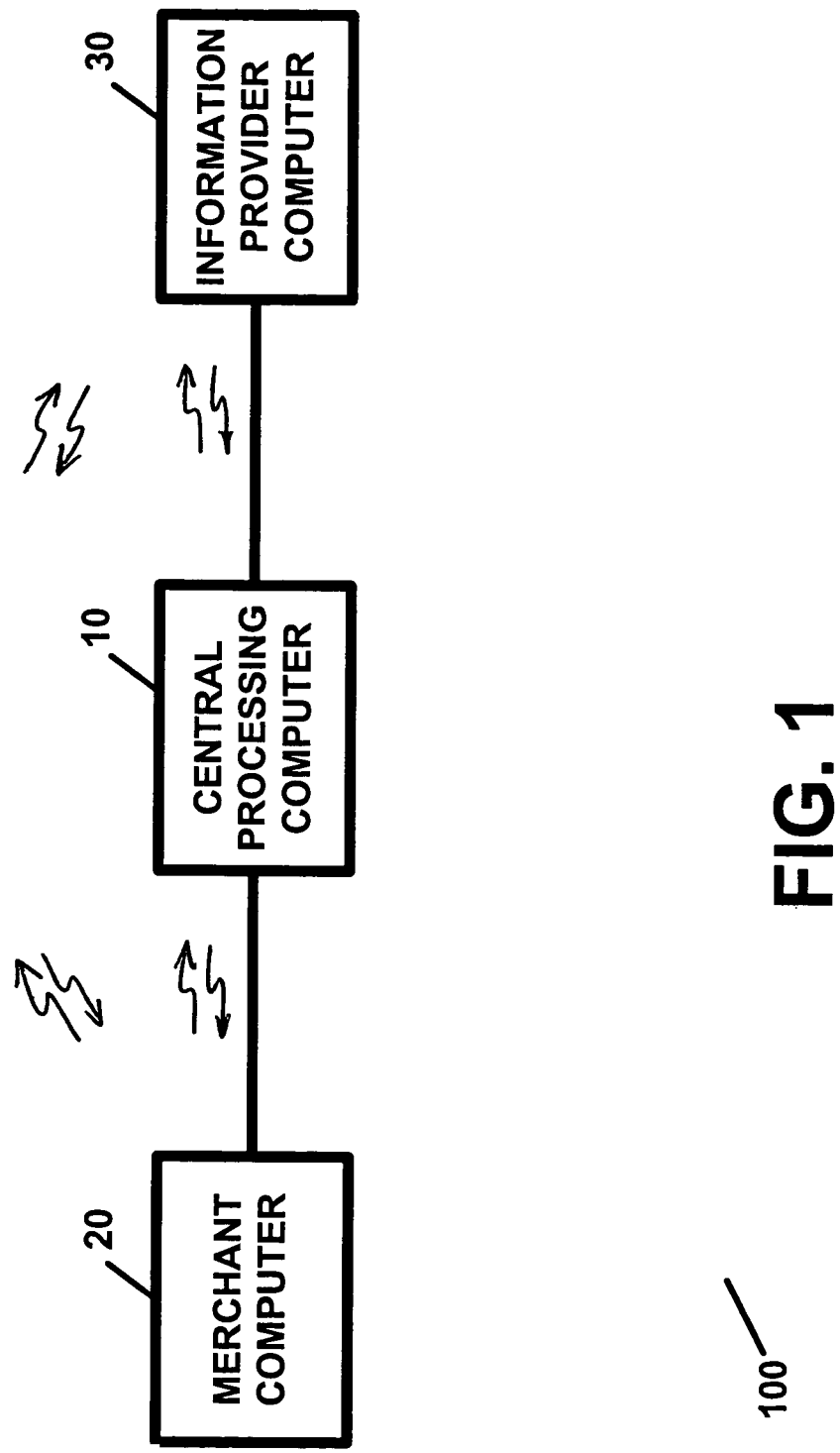
FIG. 1 illustrates the apparatus of the present invention, in block diagram form.

The present invention pertains to an apparatus and method for providing transaction history information, account history information, and/or charge-back information, or individual information, and, in particular, to an apparatus and method for providing transaction history information, account history information, and/or charge-back information, or individual information, which can be utilized by an individual, entity, merchant, vendor, or provider, or other entity, in processing, and/or in assessing the processing of, a transaction in order to prevent and/or in order to reduce the incidence of any one or more of credit card fraud, credit account fraud, charge card fraud, charge account fraud, debit card fraud, debit account fraud, check fraud, checking account fraud, and/or cyber-shoplifting, and/or in order to prevent and/or in order to reduce the incidence of fraud or fraudulent activities occurring on, or which have occurred, in, on, or in connection with, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

The apparatus and method of the present invention can be utilized to in order to process information regarding fraudulent use of, or fraudulent activity regarding, any one or more of credit cards, credit accounts, credit card accounts, charge cards, charge accounts, charge card accounts, debit cards, debit accounts, debit card accounts, electronic money accounts, checks, or checking accounts.

The apparatus and method of the present invention can be utilized to in order to process information regarding fraudulent use, or fraudulent activity regarding, of any one or more of any of the herein-described bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to, any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

The apparatus and method of the present invention can also be utilized to in order to process information regarding checks returned due to insufficient funds, checks for which stop payment orders have been made, disputes and/or denial of payment assertions made in conjunction with any one or more of credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to, any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

The apparatus and method of the present invention can also process information regarding past denials of liability or responsibility regarding a transaction, past charge-back activity involving any one or more of a credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

The apparatus and method of the present invention can also process and/or provide information regarding unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, an individual, for any number of individuals.

The apparatus and method of the present invention can also process and/or provide information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, an individual, for any number of individuals. The apparatus and method of the present invention can also process and/or provide information regarding a judgment(s) issued against or involving, a judgment(s) satisfied involving, or an unsatisfied judgment(s) involving, an individual, for, of, associated with, or regarding, an individual or any number of individuals.

The apparatus and method of the present invention can also process and/or provide any other information regarding an individual, for any number of individuals, which may be deemed of interest to a merchant, vendor, or provider, of goods, products, and/or services, to process information regarding a counterpart or counterparty to a transaction in order to determine if an individual could be a risk, could be a credit risk, or might not fulfill payment obligations relating to a transaction.

The information obtained from the apparatus and method of the present invention can also be utilized by an individual, an entity, a merchant, a vendor, a provider, and/or any other entity, in order to process a transaction, and/or in order to assess whether or not it should fulfill an order relating to a transaction. For example, a merchant can obtain information regarding a purchaser's history of utilizing a credit card in an on-line transaction, receiving the goods which were the subject of a transaction and, thereafter, disputing the corresponding credit card charge and/or denying having ever made the transaction. In this manner, the merchant can utilize the information in order to assess whether or not to fulfill a transaction and/or to cancel the transaction and possibly avoid a charge-back being imposed upon it and the losses relating thereto which can include the loss of the goods, the payment for the goods, a "charge-back" fee, and/or any other charges or costs which can be associated with the charge-back.

The apparatus and method of the present invention can also be utilized in order to perform risk management in transactions involving payment by any or more of credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

The apparatus and method of the present invention can also be utilized in face-to-face transactions, non-face-to-face transactions, telephone transactions, on-line transactions, mail order transactions, and/or in any other non-cash transactions.

The apparatus and method of the present invention can be utilized in order to provide information at any time during, prior to, and/or subsequent to, a transaction. The apparatus and method of the present invention can be utilized by a merchant, vendor, provider, or other entity, in order to assess an individual's or an entity's past transaction history, account history, or charge-back history, or other information, in order to determine if the individual or entity has had a history of, or could be a risk in, denying being party to a transaction involving a credit card, a credit account, a charge card, a charge account, a debit card, a debit account, or a checking account, or any other account of the herein-described accounts, disputing a transaction a involving credit card, a credit account, a charge card, a charge account, a debit card, a debit account, or any other account of the herein-described accounts, passing or attempting to pass a bad check, stopping payment of an issued check, and/or in other ways attempting to defraud or otherwise obtain goods, products, or services, without paying for same, shopping same, and/or cyber-shoplifting same.

The apparatus and method of the present invention can be utilized in order to allow a merchant, vendor, or provider, of goods, products, and/or services, to process information regarding a counterpart or counterparty to a transaction in order to determine if the counterpart or counterparty could be a risk, could be a credit risk, or might not fulfill payment obligations relating to a transaction.

For example, a merchant, by obtaining information regarding an individual's credit card or charge card purchasing history can utilize the apparatus and method of the present invention in order to ascertain that an individual has, in the past, repudiated and/or denied making an on-line credit card purchase or charge card purchase, while all the while, the individual or a family member had, in fact, made the purchase and received a good or product, and causing a charge-back to be imposed on the merchant along with the non-return of the respective good or product, as well as causing the merchant to absorb any fees or costs associated with the charge-back, the transaction and/or the order fulfillment process. In a similar manner, a merchant can ascertain that an individual has, in the past, paid for goods, products, or services, with a check which is subsequently refused payment due to insufficient funds and/or for a check which the individual has subsequently issued a stop payment order.

In these instances, the apparatus and method of the present invention, by providing the merchant with information regarding transaction history information, account history information, and/or charge-back information, or individual information, can allow the merchant to take any necessary precautions and/or steps in order to minimize its risk of loss in transactions with individuals.

As defined herein, the terms "user, "merchant", "vendor", "provider", or the plural of same, refer to any merchant, merchants, vendor, vendors, provider, and/or providers, of any goods, products, or services, who or which utilize the apparatus and method of the present invention in order to obtain and/or utilize the information provided thereby.

As defined herein, the term "account", "credit card account", "charge card account", "debit card account", "electronic money account", or "checking account", or any other respective account of, or corresponding to, any of the various herein-described accounts, or the plural of same, refers to any of the respective and/or any of the herein-described accounts or accounts which can be utilized by an individual and/or entity in order to engage in a transaction with any of the herein-defined merchants, vendors, and/or providers.

As defined herein, the term "account", or the plural of same, also refers to a credit account, a charge account, a debit card account, a debit account, a bank account, a checking account, an automated teller machine account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, or any other accounts, policies, plans, or programs, noted, referred to, described, or referenced, herein.

As defined herein, the terms "operator" or "administrator", or the plural of same, refer to any operators or administrators who or which operate and/or administer the operation of the apparatus of the present invention and/or any of the central processing computer or computers utilized in conjunction with same.

The apparatus and method of the present invention can provide transaction history information, account history information, and/or charge-back information, or individual information, or any of the information described herein as being provided by the apparatus and method of the present invention, any one or more of during a transaction, during a transaction authorization process, subsequent to a transaction, subsequent to a transaction authorization process, prior to a providing of a service, prior to an order fulfillment process, and/or during an order fulfillment process.

The apparatus and method of the present invention can also process information received, concerning any of the herein-described individuals or entities, from any one or more of credit card issuers, credit account administrators, charge card issuers, charge account administrators, debit card issuers, debit account administrators, electronic money account administrators, checking account administrators, and/or any banks and/or financial institutions and/or other entities which facilitate, manage, operate, and/or administer, any of the herein-described accounts.

The apparatus and method of the present invention can process information received, concerning any of the herein-described individuals or entities, from any merchants, vendors, and/or providers of goods, products, and/or services, credit agencies, governmental or other entities or agencies, and/or any other individual, individuals, entity, and/or entities.

Applicant hereby incorporates by reference herein the subject matter and teachings of U.S. Provisional Patent Application Ser. No. 60/262,167 which teaches and discloses an apparatus and method for providing transaction history information, account history information, and/or charge-back information.

FIG. 1 illustrates a preferred embodiment of the apparatus of the present invention which is designated generally by the reference numeral 100, in block diagram form. With reference to FIG. 1, the apparatus 100 includes a central processing computer 10.

The central processing computer 10 can perform any of the herein-described processing routines and/or processing operations, as well as any of the communication operations described herein as being provided by the apparatus 100 and/or the central processing computer 10. The central processing computer 10 can perform any of the herein-described processing routines and/or processing operations, and can perform any of the functions and functionality described herein, for any of the herein-described credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

The central processing computer 10 can be a stand-alone computer, computer system, and/or group of computers, which can be dedicated to performing the processing routines and functionality of the central processing computer 10, and/or can be, can be linked to, and/or can be integrated with, a credit card account authorization computer, a credit card account issuer computer, a credit account authorization computer, a credit card account administration computer, a credit account administration computer, a charge card account authorization computer, a charge card account issuer computer, a charge account authorization computer, a charge card account administration computer, a charge account administration computer, a debit card account authorization computer, a debit card account issuer computer, a debit account authorization computer, a debit card account administration computer, a debit account administration computer, an electronic money account authorization computer, an electronic money account issuer computer, an electronic money account administration computer, a checking account computer, a checking account administration computer, a checking account issuer computer, a bank computer, a financial institution computer, and/or any other computer or computer system which can be utilized in order to process information, to process transactions, to provide information, and/or to service, any of the herein-described accounts, including, but not limited to, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

The central processing computer 10 can process and/or provide any of the information described herein as being provided by the apparatus 100 and/or can perform any of the processing routines described herein as being performed by the apparatus 100.

The central processing computer 10 can be a computer, a computer system, a network computer, a server computer, and/or a communication device, and/or any combination of same.

The central processing computer 10 can service any number of the herein-described individuals, entities, merchants, vendors, and/or providers, and/or any of the accounts with any of the individuals, account holders, and/or account owners, associated with any of the herein-described accounts.

The central processing computer 10 can include any number of central processing computers. Any number of central processing computers 10 can be utilized in conjunction with the apparatus 100.

With reference once again to FIG. 1, the apparatus 100 can also include one or more merchant communication devices or computers 20 (hereinafter referred to as "merchant computer 20" or "merchant computers 20") which can be associated with any of the herein-described individuals, entities, merchants, vendors, and/or providers, who or which utilize the apparatus 100. An individual, entity, merchant, vendor, or provider, can also have multiple merchant computers 20 associated therewith.

Any of the herein-described merchant computers can be, can be linked with, and/or can be integrated with, a credit card account authorization device, a credit account authorization device, a charge card account authorization device, a charge account authorization device, a debit card account authorization device, a debit account authorization device, an electronic money account authorization device, an automated teller machine (ATM), a checking account authorization device, and/or a bank and/or financial institution device or computer, and/or any other computer, authorization device, or other device, which can utilized in connection with processing information regarding, or a transaction regarding or involving, or a transaction authorization regarding or involving, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

Any number of merchant computers 20 can be utilized in conjunction with the apparatus 100.

The merchant computer 20 can transmit information to as well as receive information from the central processing computer(s) 10.

The merchant computer 20 can be any one or more of a device, an account authorization device, a computer, a computer system, a group of computers, a telephone, a personal computer, a wireless telephone, a personal digital assistant, a video telephone, a personal communication device, a wireless device, a handheld device, a palm-top device, and/or any other communication device(s) and/or computer(s).

With reference once again to FIG. 1, the apparatus 100 can also include one or more information provider communication devices or computers 30 (hereinafter referred to as "information provider computer 30" or "information provider computers 30").

The information provider computer 30 can be associated with a credit card issuer, a credit account administrator, a charge card issuer, a charge account administrator, a debit card issuer, a debit account administrator, an electronic money account administrator, a checking account administrator, a bank, a financial institution, any entity which facilitates, manages, operates, and/or administers, any of the herein-described accounts, a merchant, a vendor, a provider, a credit rating agency or service, a governmental or other entity or agency, and/or any other entity which can provide information regarding any transaction history information, account history information, and/or charge-back information, or individual information, any of the herein-described information, and/or any information related thereto, for, or regarding, any of the individuals or entities described herein as engaging in transactions with any of the herein-described merchants, vendors, and/or providers.

The information provider computer 30 can transmit information to as well as receive information from the central processing computer(s) 10. In the preferred embodiment, any of the herein-described credit card issuers, credit account administrators, charge card issuers, charge account administrators, debit card issuers, debit account administrators, electronic money account administrators, checking account administrators, banks, financial institutions, any entity which facilitates, manages, operates, and/or administers, any of the herein-described accounts, and/or entities which facilitate, manage, operate, and/or administer, any of the herein-described accounts, merchants, vendors, providers, credit rating agencies or services, or governmental or other entities or agencies, can access the central processing computer 10 at any time via its respective information provider computer 30 and transmit and/or provide, to the central processing computer 10, any of the herein-described transaction history information, account history information, and/or charge-back information, or individual information, or any of the herein-described information, and/or any information related thereto, for, or regarding, any of the individuals or entities described herein as engaging in transactions with any of the herein-described merchants, vendors, and/or providers.

The information provider computer 30 can be any one or more of a computer, a computer system, and/or a group of computers. Any number of information provider computers 30 can be utilized in conjunction with the apparatus 100.

The information provider computer 30 can be any one or more of a device, an account authorization device, a computer, a computer system, a group of computers, a telephone, a personal computer, a wireless telephone, a personal digital assistant, a video telephone, a personal communication device, a wireless device, a handheld device, a palm-top device, and/or any other communication device(s) and/or computer(s).

Any number of central processing computers 10, merchant computers 20, and/or information provider computers 30, can be utilized in conjunction with the present invention.

The central processing computers 10, the merchant computers 20, and/or the information provider computers 30, can communicate with, transmit information to, and/or receive information from, any other central processing computers 10, merchant computers 20, and/or the information provider computers 30, over any suitable communication network or system, including, but not limited to a telephone network, a telecommunication network, a digital communication network, a satellite communication network, a wireless communication network, a personal communication services network, a broadband communication network, a bluetooth communication network, the Internet, the World Wide Web, and/or any other communication network and/or system.

The apparatus 100 can be utilized on, over, and/or in conjunction with, any suitable communication network or system, including, but not limited to a telephone network, a telecommunication network, a digital communication network, a satellite communication network, a wireless communication network, a personal communication services network, a broadband communication network, a bluetooth communication network, the Internet, the World Wide Web, and/or any other communication network and/or system.

Any of the central processing computers 10, the merchant computers 20, and/or the information provider computers 30, can include, where appropriate and/or where suitable, a central processing unit (CPU), a random access memory (RAM), a read only memory (ROM), an input device, a display device, a receiver, a transmitter, a database, and an output device.

Figure 2:
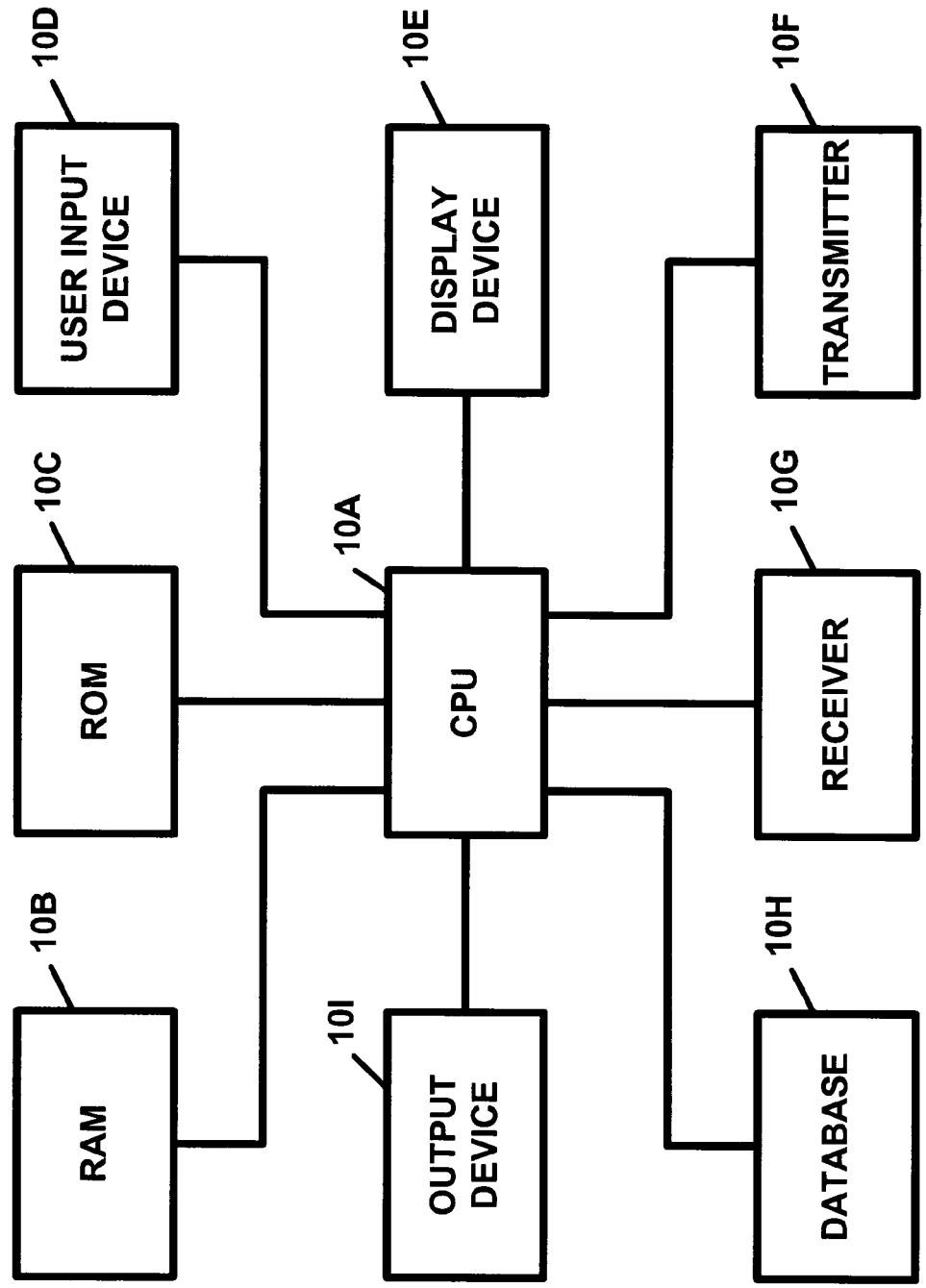
FIG. 2 illustrates the central processing computer of FIG. 1, in block diagram form.

FIG. 2 illustrates the central processing computer 10 of FIG. 1, in block diagram form. With reference to FIG. 2, the central processing computer 10 includes a central processing unit or CPU 10A, which in the preferred embodiment, is a microprocessor. The CPU 10A may also be a microcomputer, a minicomputer, a macro-computer, and/or a main-frame computer, depending upon the application.

The central processing computer 10 also includes a random access memory device(s) 10B (RAM) and a read only memory device(s) 10C (ROM), each of which is connected to the CPU 10A, a user input device 10D, for entering data and/or commands into the central processing computer 10, which includes any one or more of a keyboard, a scanner, a user pointing device, such as, for example, a mouse, a touch pad, and/or an audio input device and/or a video input device, etc., if desired, which input device(s) is also connected to the CPU 10A. The central processing computer 10 also includes a display device 10E for displaying data and/or information to a user or operator.

The central processing computer 10 also includes a transmitter(s) 10F, for transmitting signals and/or data and/or information to any one or more of the central processing computers 10, the merchant computers 20, and/or the information provider computers 30, which may be utilized in conjunction with the present invention.

The central processing computer 10 also includes a receiver 10G, for receiving signals and/or data and/or information from any one or more of the central processing computer(s) 10, the merchant computers 20, and/or the information provider computers 30, which may be utilized in conjunction with the present invention.

With reference to FIG. 2, the central processing computer 10 also includes a database 10H. The database 10H can contain any data, information, software programs, software algorithms, and/or any other information needed and/or desired for performing any of the processing routines and/or functionality described herein as being performed by the central processing computer(s) 10 and/or by the apparatus 100.

The database 10H can also include any data and/or information needed and/or desired for performing any of the processing routines and/or functionality described herein as being performed by any of the merchant computers 20, and/or the information provider computers 30, described herein.

The database 10H can contain data and/or information regarding any of the individuals, entities, account holders, and/or account owners, of any of the credit card accounts, credit accounts, charge card accounts, charge accounts, debit card accounts, debit accounts, electronic money accounts, checking accounts, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts, described herein. The database 10H can also include contact information for any of the individuals, entities, account holders, account owners, including, but not limited to, name(s), address or addresses, mailing address or mailing addresses, telephone number(s), facsimile number(s), e-mail address or e-mail addresses, uniform resource locator (URL) or URLs, contact information, and/or contact name(s).

The database 10H can also contain, for each account, and/or for each type of account, the account number, information regarding transactions which have occurred on the account, information regarding counterparts or counterparties to transactions on the account, information regarding account payments, information regarding account payment history, information regarding transactions denials made by respective individuals, entities, account holders, and/or account owners, information regarding disputes involving or regarding transactions involving credit card accounts, credit accounts, charge card accounts, charge accounts, debit card accounts, debit accounts, electronic money accounts, checking accounts, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts, described herein.

The database 10H can also contain, for each account, and/or for each type of account, information regarding fraudulent use, and/or alleged fraudulent use, of, on, or involving, credit card accounts, credit accounts, charge card accounts, charge accounts, debit card accounts, debit accounts, electronic money accounts, checking accounts, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts, described herein.

The database 10H can also contain, for each account, and/or for each type of account, information regarding fraudulent transactions, and/or alleged fraudulent transactions, on or involving, credit card accounts, credit accounts, charge card accounts, charge accounts, debit card accounts, debit accounts, electronic money accounts, checking accounts, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts, described herein.

The database 10H can also contain, for each account, and/or for each type of account, information regarding the non-providing, and/or the alleged non-providing, of goods, products, and/or services, in a transaction(s), on or involving, credit card accounts, credit accounts, charge card accounts, charge accounts, debit card accounts, debit accounts, electronic money accounts, checking accounts, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts, described herein.

The database 10H can also contain, for each account, and/or for each type of account, information regarding the charging-back of payment(s) in a transaction(s), on or involving, credit card accounts, credit accounts, charge card accounts, charge accounts, debit card accounts, debit accounts, electronic money accounts, checking accounts, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts, described herein.

The database 10H can also contain, for each account, and/or for each type of account, information regarding the number of charge-backs on an account, the types of transactions involved in a charge-back, the amount of transactions involved a charge-back, the type of goods, products, and/or services, involved in a charge-back, the merchants, vendors, or providers, involved in a charge-back, the accounts, individuals, entities, account holders, and/or account owners, involved in a charge-back, the account or account involved in a charge-back, probability and/or statistical information regarding the likelihood that an account, a transaction, an individual, an entity, an account holder, and/or an account owner, can or may be involved in a charge-back.

The database 10H can also contain, for each account, and/or for each type of account, information regarding the stopping of payment in a transaction(s), on or involving, credit card accounts, credit accounts, charge card accounts, charge accounts, debit card accounts, debit accounts, electronic money accounts, checking accounts, credit cards, credit accounts, credit card accounts, charge cards, charge accounts, charge card accounts, debit cards, debit accounts, debit card accounts, electronic money accounts, checks, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts, described herein.

The database 10H can also contain, for each account, and/or for each type of account, or for any other herein-described accounts, policies, plans, or programs, information regarding the number of stopping of payments on an account, the types of transactions involved in a stopping of payment, the amount of transactions involved a stopping of payment, the type of goods, products, and/or services, involved in a stopping of payment, the merchants, vendors, or providers, involved in a stopping of payment, the accounts, individuals, entities, account holders, and/or account owners, involved in a stopping of payment, the account or account involved in a stopping of payment, probability and/or statistical information regarding the likelihood that an account, a transaction, an individual, an entity, an account holder, and/or an account owner, can or may be involved in a stopping of payment, and/or any other related information.

The database 10H can contain data and/or information regarding any of the herein-described merchants, vendors, providers, credit card issuers, credit account administrators, charge card issuers, charge account administrators, debit card issuers, debit account administrators, electronic money account administrators, checking account administrators, banks, financial institutions, or any provider, issuer, or administrator, of or for any of the herein-described accounts, or policies, plans, or programs, described herein, and/or information regarding any individual, entities, merchants, vendors, providers, credit rating agencies or services, credit agencies, governmental or other entities or agencies, and/or information providers, of, for, or relating to, any of the herein-described accounts. The database 10H can also include contact information for any of the herein-described individuals, entities, merchants, vendors, providers, credit card issuers, credit account administrators, charge card issuers, charge account administrators, debit card issuers, debit account administrators, electronic money account administrators, checking account administrators, banks, financial institutions, or any provider, issuer, or administrator, of or for any of the herein-described accounts, or policies, plans, or programs, described herein, or entities, merchants, vendors, providers, credit rating agencies or services, credit agencies, governmental or other entities or agencies, and/or information providers, including, but not limited to, name(s), address or addresses, mailing address or mailing addresses, telephone number(s), facsimile number(s), e-mail address or e-mail addresses, uniform resource locator (URL) or URLs, contact information, and/or contact name(s).

The database 10H can also contain information regarding accounts, financial accounts, transaction accounts, and/or non-financial accounts, for, or associated with, any of the herein-described individuals, entities, merchants, vendors, providers, credit card issuers, credit account administrators, charge card issuers, charge account administrators, debit card issuers, debit account administrators, electronic money account administrators, checking account administrators, banks, financial institutions, or any providers, issuers, or administrators, of or for any of the herein-described accounts, or policies, plans, or programs, described herein, and/or or entities, merchants, vendors, providers, credit rating agencies or services, credit agencies, governmental or other entities or agencies, and/or information providers.

The database 10H can also contain, for each of the accounts, and/or for each type of account, for or associated with the respective individuals, entities, merchants, vendors, providers, credit card issuers, credit card administrators, charge card issuers, charge account administrators, debit card issuers, debit account administrators, electronic money account administrators, checking account administrators, banks, financial institutions, and/or or entities, merchants, vendors, providers, credit rating agencies or services, credit agencies, governmental or other entities or agencies, or any providers, issuers, or administrators, of or for any of the herein-described accounts, or policies, plans, or programs, described herein, and/or information providers, the account number, information regarding transactions which have occurred on the account, information regarding counterparts or counterparties to transactions on the account, information regarding account payments, information regarding account billing collection, information regarding account payment history, information regarding account bill collection history, information regarding transactions denials made by respective individuals, entities, account holders, and/or account owners, information regarding disputes involving or regarding transactions involving credit card accounts, credit accounts, charge card accounts, charge accounts, debit card accounts, debit accounts, electronic money accounts, checking accounts, or any of the other herein-described accounts, information regarding fraudulent use, and/or alleged fraudulent use, of or involving, credit card accounts, credit accounts, charge card accounts, charge accounts, debit card accounts, debit accounts, electronic money accounts, checking accounts, or any of the other herein-described accounts, information regarding fraudulent transactions, and/or alleged fraudulent transactions, on or involving, credit card accounts, credit accounts, charge card accounts, charge accounts, debit card accounts, debit accounts, electronic money accounts, checking accounts, or any of the other herein-described accounts, information regarding the non-providing, and/or the alleged non-providing, of goods, products, and/or services, in a transaction(s), on or involving, credit card accounts, credit accounts, charge card accounts, charge accounts, debit card accounts, debit accounts, electronic money accounts, checking accounts, or any of the other herein-described accounts, information regarding the charging-back of payment(s) in a transaction(s), on or involving, credit card accounts, credit accounts, charge card accounts, charge accounts, debit card accounts, debit accounts, electronic money accounts, checking accounts, or any of the other herein-described accounts, the number of charge-backs on an account, the types of transactions involved in a charge-back, the amount of transactions involved a charge-back, the type of goods, products, and/or services, involved in a charge-back, the accounts, individuals, entities, merchants, vendors, or providers, involved in a charge-back, the accounts, individuals, entities, account holders, and/or account owners, involved in a charge-back, the account or account involved in a charge-back, probability and/or statistical information regarding the likelihood that an account, a transaction, an individual, an entity, an account holder, and/or an account owner, can or may be involved in a charge-back, information regarding the stopping of payment in a transaction(s), on or involving, credit card accounts, credit accounts, charge card accounts, charge accounts, debit card accounts, debit accounts, electronic money accounts, checking accounts, or any of the other herein-described accounts, the number of stopping of payments on an account, the types of transactions involved in a stopping of payment, the amount of transactions involved a stopping of payment, the type of goods, products, and/or services, involved in a stopping of payment, the accounts, merchants, vendors, or providers, involved in a stopping of payment, the individuals, entities, account holders, and/or account owners, involved in a stopping of payment, the account or account involved in a stopping of payment, probability and/or statistical information regarding the likelihood that an account, a transaction, an individual, an entity, an account holder, and/or an account owner, can or may be involved in a stopping of payment, and/or any other related information.

The database 10H can also include information regarding resolution of disputes, resolution of transactions denials, resolution of allege fraudulent use of account accusations, resolution of charge-backs, resolution of stopping of payments, and/or any other information for, or regarding, any of the herein-described accounts, and/or any of the individuals, entities, account holders, account owners, merchants, vendors, providers, and/or any of the credit card issuers, credit account administrators, charge card issuers, charge account administrators, debit card issuers, debit account administrators, electronic money account administrators, checking account administrators, banks, financial institutions, or providers, issuers, or administrators, of or for any of the herein-described accounts, or policies, plans, or programs, described herein, and/or or entities, described herein.

The database 10H can also contain account information or any other account information, account identification information, account history information, account payment information, account non-payment information, transaction information, information regarding transaction denial, account charge-back information, account stopping of payment information, and/or any other pertinent or relevant information needed and/or desired for performing any of the processing routines and/or functionality described herein as being performed and/or as being provided by the central processing computer 10 and/or the apparatus 100.

The database 10H can also contain information regarding unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, an individual, for any number of individuals.

The database 10H can also include information regarding instances or fraudulent activity, or allegations of fraud perpetrated, on, involving, or associated with, any of the herein-described accounts, or policies, plans, or programs, described herein.

The database 10H can also contain information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, an individual, for any number of individuals. The database 10H can also contain information regarding a judgment(s) issued against or involving, a judgment(s) satisfied involving, or an unsatisfied judgment(s) involving, an individual, for, of, associated with, or regarding, an individual or any number of individuals.

The database 10H can also contain any other information regarding an individual, for any number of individuals, which may be deemed of interest to a merchant, vendor, or provider, of goods, products, and/or services, to process information regarding a counterpart or counterparty to a transaction in order to determine if an individual could be a risk, could be a risk of loss risk, could be a credit risk, or might not fulfill payment obligations relating to a transaction.

Any of the data and/or information described herein can be provided from multiple information sources and/or from multiple individuals or entities by utilizing any of the respective central processing computers 10, merchant computers 20, and/or information provider computers 30.

The database 10H can also contain any other information which may be relevant, pertinent, useful, and/or desired, for facilitating the operation of the apparatus 100 and method of the present invention as described herein and/or as related thereto.

The database 10H, in the preferred embodiment, is a database which may include individual databases or collections of databases, with each database being designated to store any and all of the data and/or information described herein. Applicant hereby incorporates by reference herein the teachings of Basic Business Statistics Concepts and Applications, Mark L. Berenson and David M. Levine, $6^{th}$ Edition, Prentice Hall 1996.

The database 10H, or collection of databases, may be updated by each of the respective users, individuals, central processing computer operators or administrators, merchants, vendors, providers, credit card issuers, credit account administrators, charge card issuers, charge account administrators, debit card issuers, debit account administrators, electronic money account administrators, checking account administrators, banks, financial institutions, or any of the providers, issuers, or administrators, of or for any of the herein-described accounts, or accounts, policies, plans, or programs, described herein, and/or or entities, merchants, vendors, providers, credit rating agencies or services, credit agencies, creditors, loan originators, loan servicing entities, governmental or other entities or agencies, and/or any other information providers, which can provide any of the information described herein as being utilized in connection with the apparatus and method of the present invention and/or any of the information described herein as being stored in the database 10H, in real-time and/or otherwise, and/or via dynamically linked database management techniques.

It is envisioned, in the preferred embodiment, that the database 10H, or collection of databases, can be updated upon the availability of, and/or the making available of, any information and/or information updates concerning any of the information, account information, and/or other information, described herein as being stored in the database 10H. The information stored in the database 10H can be updated by any of the herein-described users, individuals, central processing computer operators or administrators, merchants, vendors, providers, credit card issuers, credit account administrators, charge card issuers, charge account administrators, debit card issuers, debit account administrators, electronic money account administrators, checking account administrators, banks, financial institutions, or any of the providers, issuers, or administrators, of or for any of the herein-described accounts, or accounts, policies, plans, or programs, described herein, and/or or entities, merchants, vendors, providers, credit rating agencies or services, credit agencies, governmental or other entities or agencies, and/or information providers, who or which can provide the information to the central processing computer 10 in any appropriate manner and/or who or which can transmit the information to the central processing computer 10 via a respective merchant computer 20, via a respective information provider computer 30, and/or via any other computer or communication device, in real-time and/or otherwise.

The data and/or information stored in the database 10H can also be updated by external sources. The database 10H will contain any and all information deemed necessary and/or desirable for providing all of the processing and/or services and/or functions described herein. Applicant hereby incorporates by reference herein the subject matter of Fundamentals of Database Systems, by Ramez Elmasri and Shamkant B. Navathe, $2^{nd}$ Ed., Addison-Wesley Publishing Company, 1994.

With reference once again to FIG. 2, the central processing computer 10 also includes an output device 10I such as a printer, a modem, a fax/modem, or other output device, for outputting information to the operator or user of the central processing computer 10 or to a third party or third party entity.

The apparatus 100 and method of the present invention can be utilized, in a preferred embodiment, in order to provide information to an individual, entity, merchant, vendor, or provider, regarding charge-backs, stopping of payments, and/or failures to make payments, which have occurred in an account of an individual or entity with whom the respective individual, entity, merchant, vendor, or provider, is currently engaging in a transaction. For example, a merchant can obtain information indicating that a purchasing individual has, in the past, engaged in credit card charge disputing activity regarding a previous transaction which has resulted in a charge-back to the merchant involved in the previous transaction.

The apparatus 100 can provide detailed information to the merchant regarding the transaction and subsequent activities. For example, the apparatus 100 can provide the merchant with information indicating that the purchase was an on-line credit card purchase, that the purchasing individual provided certain identification and/or other information, and that the individual credit card account holder later claimed to have not made, or did not authorize the credit card purchase.

In another preferred embodiment, the apparatus 100 and method of the present invention can be utilized in order to determine whether an individual paying for a transaction by check has previously stopped payment of a check in a previous transaction. The apparatus 100 and method of the present invention can also provide information regarding the transaction and subsequent activities.

In another preferred embodiment, the apparatus 100 and method of the present invention can be utilized in order to determine whether an individual paying for a transaction with a check has previously had a check returned due to insufficient funds and/or "bounced" a check.

In another preferred embodiment, the apparatus 100 and method of the present invention can be utilized in order to provide transaction history information, account history information, and/or charge-back information, or individual information, including the above-described charge-back, check stopping of payment, or check bouncing, information, during a transaction authorization process, prior to an transaction authorization process, subsequent to transaction authorization process, prior to a providing of a service, a good, or a product, and/or prior to a goods, products, and/or services, shipment and/or delivery.

In another preferred embodiment, the apparatus 100 and method of the present invention can be utilized in conjunction with a transaction process and/or a transaction authorization process.

Figure 3:
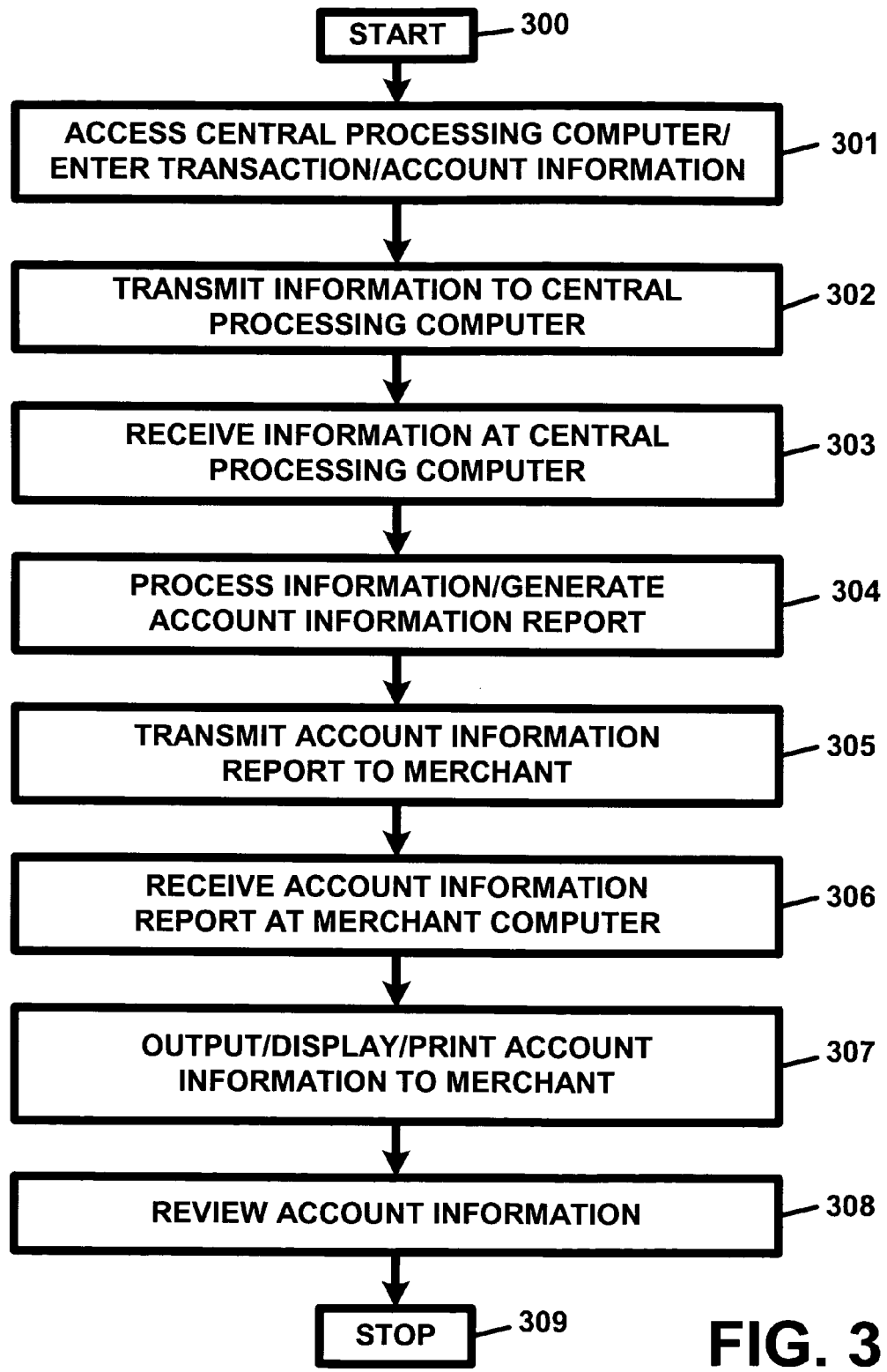
FIG. 3 illustrates a preferred embodiment method for utilizing the apparatus of FIG. 1, in flow diagram form.

FIG. 3 illustrates a preferred embodiment method for utilizing the apparatus 100 of the present invention, in flow diagram form. In the embodiment of FIG. 3, the apparatus 100 of the present invention can be utilized in order to provide information to a merchant, vendor, or provider, regarding a charge-back(s), a stopping of payment(s), and/or a non-payment(s) due to insufficient funds, which have occurred on, in conjunction with, and/or relating to, any of the herein-described accounts.

The embodiment of FIG. 3 can be utilized to provide information regarding charge-backs which have occurred on, in conjunction with, and/or relating to, credit card accounts, credit accounts, charge card accounts, charge accounts, debit card accounts, debit accounts, checking accounts, bank accounts, automated teller machine accounts, and/or other accounts.

The embodiment of FIG. 3 can also be utilized in order to provide information regarding stopping of payments which have occurred on, in conjunction with, and/or relating to, credit card accounts, credit accounts, charge card accounts, charge accounts, debit card accounts, debit accounts, checking accounts, bank accounts, automated teller machine accounts, and/or other accounts.

The embodiment of FIG. 3 can also be utilized in order to provide information regarding non-payment due to insufficient funds which have occurred on, in conjunction with, and/or relating to, credit card accounts, credit accounts, charge card accounts, charge accounts, debit card accounts, debit accounts, checking accounts, bank accounts, automated teller machine accounts, and/or other accounts.

The embodiment of FIG. 3 will be described as being utilized in order to provide information regarding charge-backs which have occurred on, in conjunction with, and/or relating to a credit card account or a charge card account. The embodiment of FIG. 3 can be utilized in a same, in a similar, and/or in an analogous manner, in order to provide any one or more of information regarding charge-backs, information regarding stopping of payments, and/or information regarding non-payment due to insufficient funds, which have occurred on, in conjunction with, and/or relating to any one or more of credit card accounts, credit accounts, charge card accounts, charge accounts, debit card accounts, debit accounts, checking accounts, bank accounts, automated teller machine accounts, and/or other accounts.

With reference to FIG. 3, the operation of the apparatus 100 commences at step 300. At step 301, a merchant who is engaged in a transaction with an individual, who is utilizing a credit card account or a charge card account to effect payment for a transaction involving any type or kind of goods, products, and/or services, can access the central processing computer 10 via a merchant computer 20.

At step 301, the merchant can access the central processing computer 10 and enter information regarding the transaction and/or information regarding the credit card account or the charge card account which the individual has presented for payment, into the merchant computer 20 associated with the merchant. The information can, for example, be entered into a transaction authorization device which can be utilized as a merchant computer 20. At step 302, the information entered into the merchant computer 20, at step 301, is transmitted to the central processing computer 10.

At step 303, the central processing computer 10 will receive the information. At step 304, the central processing computer 10 will process the information received, at step 303, in conjunction with the information stored in the database 10H. At step 304, the central processing computer 10 will generate a charge-back information report.

The charge-back information report can contain any of the herein-described information which is stored in the database 10H. The charge-back information report can, for example, contain information regarding the number and frequency of charge-backs which have occurred on the respective credit card account or charge card account, the reasons for the charge-back action, allegations made by the account holder or account owner, dispute allegations made by the account holder or account owner, allegations of fraudulent or unauthorized account activity made by the account holder or account owner, the basis for any of the above-described allegations, allegations or responses made by the merchants, vendors, or providers, involved in the transactions in question, transactions amounts involved, probability or statistical information regarding whether the account holder or account owner can be a charge-back risk in the present transaction, and/or any other information regarding charge-back(s) which have occurred on the respective account, which can or which may be useful to and/or of interest to a merchant, vendor, or provider, in assessing whether or not the present transaction may present a charge-back risk.

The charge-back information report can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The charge-back information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The charge-back information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The charge-back information report can also contain information regarding information which is missing and/or not available at the time of report generation.

In the case when the apparatus 100 is utilized to provide stopping of payment information or information regarding non-payment(s) due to insufficient funds, such as in the case of check payments, debit payments, electronic money payments, and/or other payments, the central processing computer 10 will, at step 304, process the information regarding the respective transaction and information regarding the respective account in conjunction with the information stored in the database 10H and generate a respective stopping of payment information report or non-payment(s) due to insufficient funds information report.

The respective stopping of payment(s) information report or non-payment(s) due to insufficient funds information report can contain any of the herein-described information which is stored in the database 10H. The respective stopping of payment(s) information report or non-payment(s) due to insufficient funds information report can, for example, contain information regarding the number and frequency of respective stopping of payment(s) or non-payment(s) due to insufficient funds which have occurred on the respective account, the reasons for the respective stopping of payment(s) or non-payment(s) due to insufficient funds, allegations made by the account holder or account owner, dispute allegations made by the account holder or account owner, allegations of fraudulent or unauthorized account activity made by the account holder or account owner, the basis for any of the above-described allegations, allegations or responses made by the merchants, vendors, or providers, involved in the transactions in question, transactions amounts involved, probability or statistical information regarding whether the account holder or account owner can be a respective stopping of payment(s) risk or non-payment(s) due to insufficient funds risk in the present transaction, and/or any other information regarding respective stopping of payment(s) or non-payment(s) due to insufficient funds which have occurred on the respective account, which can or which may be useful to and/or of interest to a merchant, vendor, or provider, in assessing whether or not the present transaction may present a respective stopping of payment(s) risk or non-payment(s) due to insufficient funds risk.

The respective stopping of payment(s) information report or non-payment(s) due to insufficient funds information report can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The respective stopping of payment(s) information report or non-payment(s) due to insufficient funds information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The respective stopping of payment(s) information report or non-payment(s) due to insufficient funds information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The respective stopping of payment(s) information report or non-payment(s) due to insufficient funds information report can also contain information regarding information which is missing and/or not available at the time of report generation.

In this regard, the apparatus 100 and method of the present invention can provide a wide variety of information regarding an individual involved in a transaction, to a respective merchant, vendor, or provider, of a good, product, or service.

At step 305, the central processing computer 10 can transmit the charge-back information report (or the respective stopping of payment information report or non-payment(s) due to insufficient funds information report, if applicable), to the merchant computer 20. The charge-back information report (or the respective stopping of payment information report or non-payment(s) due to insufficient funds information report, if applicable) can also be transmitted to the merchant or to the merchant computer 20 as any one or more of an e-mail message, an instant messaging message, a short message, a beeper message, a pager message, a telephone message, a recorded voice message, and/or any other electronic message or electronic transmission.

At step 306, the merchant computer 20 can receive the charge-back information report (or the respective stopping of payment information report or non-payment(s) due to insufficient funds information report, if applicable).

At step 307, the information provided and/or contained in the charge-back information report (or the respective stopping of payment information report or non-payment(s) due to insufficient funds information report, if applicable) can be displayed to the merchant or the merchant's employee or agent, can be output or printed out, and/or can otherwise be provided to the merchant or the merchant's employee or agent.

At step 308, the merchant or the merchant's employee or agent can review the information contained in the charge-back information report (or the respective stopping of payment information report or non-payment(s) due to insufficient funds information report, if applicable) and determine whether or not to proceed to engage in the transaction, to proceed to process the transaction, to proceed to consummate the transaction, or to cancel the transaction. In this manner, for example, a merchant can be apprised of past credit card or charge card disputes, denials, fraudulent use allegations, charge-back impositions, and/or cyber-shoplifting activity, which occurred on an account, which may be identified in the respective charge-back information report, or any other respective information which may be contained in the respective stopping of payment information report or non-payment(s) due to insufficient funds information report.

The merchant can then utilize the report information in order to determine either not to proceed with the transaction, to cancel the transaction or order, to request additional information, to request information to confirm and/or verify the transaction and the account holder's or the account owner's authority to enter into the transaction, to request additional assurances from the account holder or account owner, to secure the account holder's or the account owner's agreement not to dispute a charge or payment, to secure the account holder's or the account owner's agreement not to stop payment for a charge or payment, to secure the account holder's or the account owner's guarantee that sufficient funds exist to cover a payment, to secure the account holder's or the account owner's alternate agreement to guarantee payment for a charge, to secure a release of liability or claim from the account holder or account owner regarding the transaction, and/or the merchant can take any other action in order to protect its interests.

Thereafter, the operation of the apparatus 100 will cease at step 309.

In another preferred embodiment, the apparatus 100 and method of the present invention can be utilized in order to provide respective charge-back information, stopping of payment information, and/or non-payment due to insufficient funds information, to a merchant, vendor, or provider, at any time prior to the merchant's, the vendor's, or the provider's, delivery, transfer, or shipment, of the respective goods, products, and/or services, to an individual, entity, account holder, or account owner, or prior to a providing of a service, to an individual, entity, account holder, or account owner. In this regard, for example, the apparatus 100 can process and provide information to the merchant prior to the merchant's delivery, transfer, or shipment, of a good or product, to the account holder, or prior to a providing of a service, to an individual, entity, account holder, or account owner, thereby allowing the merchant to ascertain, evaluate, and/or determine, the charge-back risks, the stopping of payment risks, and/or the non-payment due to insufficient funds risks, which exist, or which may exist, in a transaction, prior to the merchant delivering, transferring, and/or shipping the good or product, or prior to providing a service, to the counterparty or account holder, and/or otherwise relinquishing possession of, or title to, the good or product.

In this manner, the apparatus 100 can be utilized in order to allow a merchant, vendor, or provider, to reduce charge-back or non-payment risks and/or to otherwise protect its interests.

Figure 4:
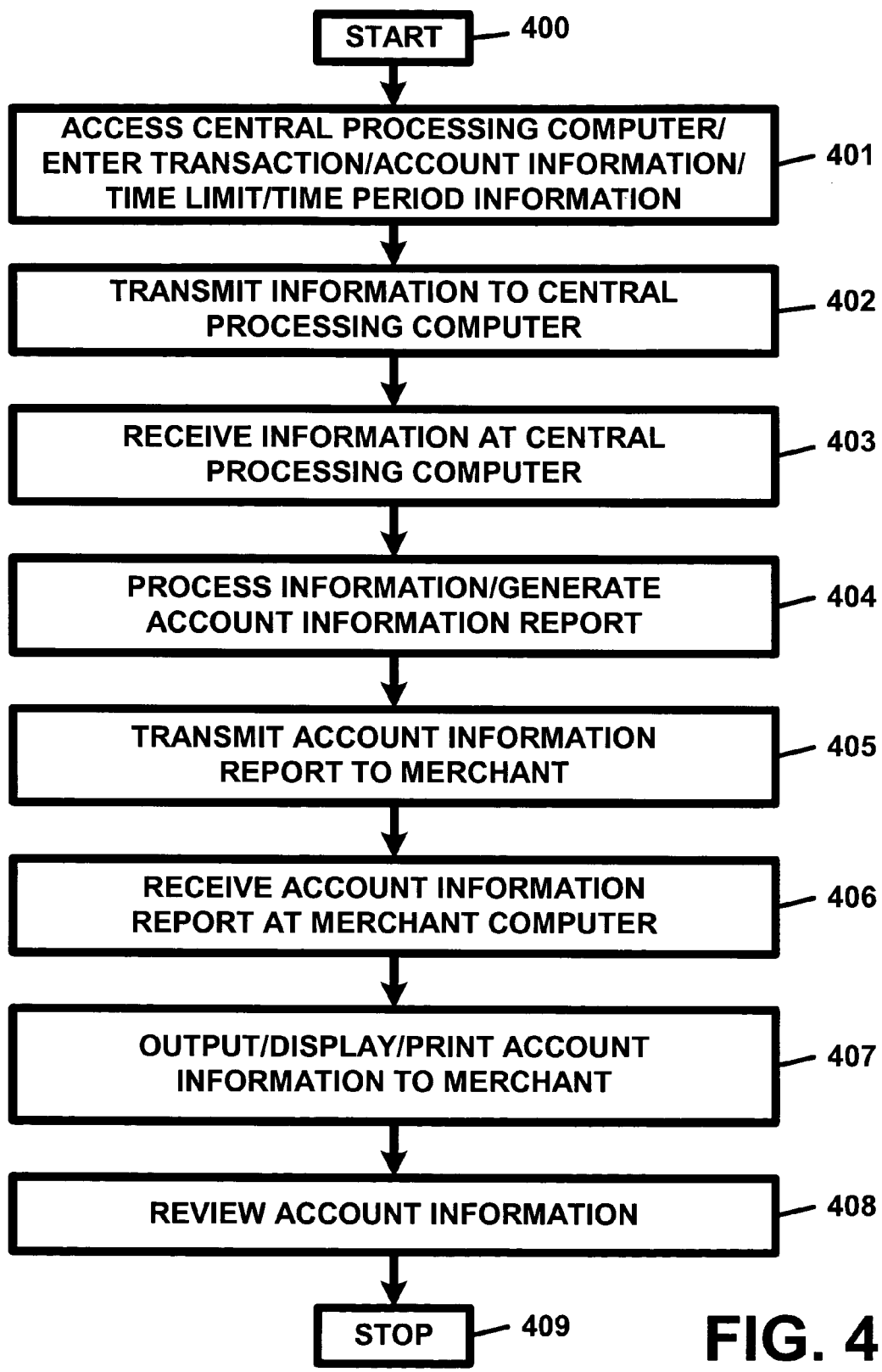
FIG. 4 illustrates another preferred embodiment method for utilizing the apparatus of FIG. 1, in flow diagram form.

FIG. 4 illustrates another preferred embodiment method for utilizing the apparatus 100 of the present invention, in flow diagram form. In the embodiment of FIG. 4, the apparatus 100 of the present invention can be utilized in order to provide information to a merchant, vendor, or provider, regarding a charge-back(s), a stopping of payment(s), and/or a non-payment(s) due to insufficient funds, which have occurred on, in conjunction with, and/or relating to, any of the herein-described accounts.

The information can be provided to the merchant, vendor, or provider, at any time prior to a pre-specified time in order to allow the merchant, vendor, or provider, to receive and review the information subsequent to the transaction but prior to delivering, transferring, or shipping, the respective goods, products, or services, to a recipient pursuant to a transaction, or prior to providing a service. In this manner, for example, a merchant can process a transaction, provide information regarding a shipping or delivery date and receive the requested information prior to shipping or delivering a good or product to a recipient, a customer, or account holder or account owner, or prior to providing a service.

For example, a merchant who or which ships goods or products three (3) days after an order is placed can be provided with transaction history information, account history information, and/or charge-back information, or individual information, or any of the herein-described information regarding the account, the individual, or the account holder or account owner prior to shipping or delivering the goods or products, or prior to the providing of a service, thereby giving the merchant the opportunity to utilize the report information in order to determine either not to proceed with the transaction, to request additional information, to request information to confirm and/or verify the transaction and the account holder's or the account owner's authority to enter into the transaction, to request additional assurances from the account holder or account owner, to secure the account holder's or the account owner's agreement not to dispute a charge or payment, to secure the account holder's or the account owner's agreement not to stop payment for a charge or payment, to secure the account holder's or the account owner's guarantee that sufficient funds exist to cover a payment, to secure the account holder's or the account owner's alternate agreement to guarantee payment for a charge, to secure a release of liability or claim from the account holder or account owner regarding the transaction, and/or the merchant can take any other action in order to protect its interests.

The embodiment of FIG. 4 can also be utilized in order to provide information regarding stopping of payments which have occurred on, in conjunction with, and/or relating to, credit card accounts, credit accounts, charge card accounts, charge accounts, debit card accounts, debit accounts, checking accounts, bank accounts, automated teller machine accounts, and/or other accounts.

The embodiment of FIG. 4 can also be utilized in order to provide information regarding non-payment due to insufficient funds which have occurred on, in conjunction with, and/or relating to, credit card accounts, credit accounts, charge card accounts, charge accounts, debit card accounts, debit accounts, checking accounts, bank accounts, automated teller machine accounts, and/or other accounts.

The embodiment of FIG. 4 will be described as being utilized in order to provide information regarding charge-backs which have occurred on, in conjunction with, and/or relating to a credit card account or a charge card account. It is to be understood, however, that the embodiment of FIG. 4 can be utilized in a same, in a similar, and/or in an analogous manner, in order to provide any one or more of information regarding charge-backs, information regarding stopping of payments, and/or information regarding non-payment due to insufficient funds, which have occurred on, in conjunction with, and/or relating to any one or more of credit card accounts, credit accounts, charge card accounts, charge accounts, debit card accounts, debit accounts, checking accounts, bank accounts, automated teller machine accounts, and/or other accounts.

With reference to FIG. 4, the operation of the apparatus 100 commences at step 400. At step 401, a merchant who is engaged in a transaction with an individual, who is utilizing a credit card account or a charge card account to effect payment for a transaction involving any type or kind of goods, products, and/or services, can access the central processing computer 10 via a merchant computer 20.

At step 401, the merchant can access the central processing computer 10 and enter information regarding the transaction and/or information regarding the credit card account or the charge card account which the individual has presented for payment, into the merchant computer 20 associated with the merchant. The merchant can also enter information regarding its shipping, transferring, or delivery, policies, including the time period (i.e. hours, days, etc.) which typically elapses in between a merchant taking an order or processing an order and shipping, transferring, or delivering, the goods, products, or services, which are the subject of the transaction, and/or otherwise fulfilling the order or obligations under the transaction, or providing a service. The merchant can also enter information regarding the shipping, transferring, and/or delivery, date and/or time, or the data and/or time for the providing of a service. The merchant can also enter a time limit or time period for receiving the report.

The information can, for example, be entered into a transaction authorization device which can be utilized as a merchant computer 20. At step 402, the information entered into the merchant computer 20, at step 401, is transmitted to the central processing computer 10.

At step 403, the central processing computer 10 will receive the information. At step 404, the central processing computer 10 will process the information received, at step 403, in conjunction with the information stored in the database 10H. At step 404, the central processing computer 10 can generate the charge-back information report immediately and/or at any time prior to the time limit specified by the merchant for receiving the report and/or prior to the shipping, transferring, and/or delivery, date and/or time, or prior to a data and/or time for a providing of a service.

If the central processing computer 10 has sufficient information for generating the charge-back information report, the central processing computer 10 can generate the charge-back information report. If the central processing computer 10 does not have all of the information for generating the charge-back information report, the central processing computer 10 can generate the charge-back information report at any time after it receives the information, but prior to the elapsing of the merchant-defined time limit or time period.

In any of the embodiments described herein, the central processing computer 10 can be programmed to check the information stored in the database 10H, at specific and/or various time intervals, in order to determine if the needed information has been provided and/or has been made available for processing and generating the charge-back information report information.

The central processing computer 10 can generate the charge-back information report upon getting the needed information. If the needed information is not available prior to the elapsing of the time limit or time period, the central processing computer 10 can generate a charge-back information report containing any available information and provide information regarding which information is missing or is not available.

The charge-back information report can contain any of the herein-described information which is stored in the database 10H. The charge-back information report can, for example, contain information regarding the number and frequency of charge-backs which have occurred on the respective credit card account or charge card account, the reasons for the charge-back action, allegations made by the account holder or account owner, dispute allegations made by the account holder or account owner, allegations of fraudulent or unauthorized account activity made by the account holder or account owner, the basis for any of the above-described allegations, allegations or responses made by the merchants, vendors, or providers, involved in the transactions in question, transactions amounts involved, probability or statistical information regarding whether the account holder or account owner can be a charge-back risk in the present transaction, and/or any other information regarding charge-back(s) which have occurred on the respective account, which can or which may be useful to and/or of interest to a merchant, vendor, or provider, in assessing whether or not the present transaction may present a charge-back risk.

The charge-back information report can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The charge-back information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The charge-back information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The charge-back information report can also contain information regarding information which is missing and/or not available at the time of report generation.

In any and/or all of the embodiments described herein, the central processing computer 10 can be programmed to automatically generate, and/or to automatically transmit to the merchant computer 20, a new or updated charge-back information report or new or updated charge-back information reports, within the merchant-defined time limit or time period, upon detecting or determining that new information, previously unavailable information, or missing information, is, or has been made, available in the database 10H. In this regard, the merchant can be automatically provided with one or more new or updated charge-back information reports within or during the merchant-defined time limit or time period, or prior to or before the date and/or time for the providing, the shipping, the transferring, and/or the delivery, of the good(s), product(s), or service(s).

In the case when the apparatus 100 is utilized to provide stopping of payment information or information regarding non-payment(s) due to insufficient funds, such as in the case of check payments, debit payments, electronic money payments, and/or other payments, the central processing computer 10 will, at step 404, process the information regarding the respective transaction and information regarding the respective account in conjunction with the information stored in the database 10H and generate a respective stopping of payment information report or non-payment(s) due to insufficient funds information report.

The respective stopping of payment(s) report or non-payment(s) due to insufficient funds information report can contain any of the herein-described information which is stored in the database 10H. The respective stopping of payment(s) information report or non-payment(s) due to insufficient funds information report can, for example, contain information regarding the number and frequency of respective stopping of payment(s) or non-payment(s) due to insufficient funds which have occurred on the respective account, the reasons for the respective stopping of payment(s) or non-payment(s) due to insufficient funds, allegations made by the account holder or account owner, dispute allegations made by the account holder or account owner, allegations of fraudulent or unauthorized account activity made by the account holder or account owner, the basis for any of the above-described allegations, allegations or responses made by the merchants, vendors, or providers, involved in the transactions in question, transactions amounts involved, probability or statistical information regarding whether the account holder or account owner can be a respective stopping of payment(s) risk or non-payment(s) due to insufficient funds risk in the present transaction, and/or any other information regarding respective stopping of payment(s) or non-payment(s) due to insufficient funds which have occurred on the respective account, which can or which may be useful to and/or of interest to a merchant, vendor, or provider, in assessing whether or not the present transaction may present a respective stopping of payment(s) risk or non-payment(s) due to insufficient funds risk.

The respective stopping of payment(s) information report or non-payment(s) due to insufficient funds information report can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The respective stopping of payment(s) information report or non-payment(s) due to insufficient funds information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The respective stopping of payment(s) information report or non-payment(s) due to insufficient funds information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The respective stopping of payment(s) information report or non-payment(s) due to insufficient funds information report can also contain information regarding information which is missing and/or not available at the time of report generation.

In any and/or all of the embodiments described herein, the central processing computer 10 can be programmed to automatically generate, and/or to automatically transmit to the merchant computer 20, a new or updated stopping of payment(s) information report or a new or updated non-payment(s) due to insufficient funds information report, or new or updated stopping of payment(s) information reports or new or updated non-payment(s) due to insufficient funds information reports, within the merchant-defined time limit or time period, upon detecting or determining that new information, previously unavailable information, or missing information, is, or has been made, available in the database 10H. In this regard, the merchant can be automatically provided with one or more new or updated stopping of payment(s) information reports or with one or more new or updated non-payment(s) due to insufficient funds information reports within or during the merchant-defined time limit or time period, or prior to or before the date and/or time for the providing, the shipping, the transferring, and/or the delivery, of the good(s), product(s), or service(s).

In this regard, the apparatus 100 and method of the present invention can provide a wide variety of information regarding an individual involved in a transaction, to a respective merchant, vendor, or provider, of a good, product, or service.

At step 405, the central processing computer 10 can transmit the charge-back information report (or the respective stopping of payment information report or non-payment(s) due to insufficient funds information report, if applicable), to the merchant computer 20. The charge-back information report (or the respective stopping of payment information report or non-payment(s) due to insufficient funds information report, if applicable) can also be transmitted to the merchant or to the merchant computer 20 as any one or more of an e-mail message, an instant messaging message, a short message, a beeper message, a pager message, a telephone message, a recorded voice message, and/or any other electronic message or electronic transmission.

At step 406, the merchant computer 20 can receive the charge-back information report (or the respective stopping of payment information report or non-payment(s) due to insufficient funds information report, if applicable).

At step 407, the information provided and/or contained in the charge-back information report (or the respective stopping of payment information report or non-payment(s) due to insufficient funds information report, if applicable) can be displayed to the merchant or the merchant's employee or agent, can be output or printed out, and/or can otherwise be provided to the merchant or the merchant's employee or agent.

At step 408, the merchant or the merchant's employee or agent can review the information contained in the charge-back information report (or the respective stopping of payment information report or non-payment(s) due to insufficient funds information report, if applicable) and determine whether or not to proceed to engage in the transaction, to proceed to process the transaction, to proceed to consummate the transaction, or to cancel the transaction. In this manner, for example, a merchant can be apprised of past credit card or charge card disputes, denials, fraudulent use allegations, charge-back impositions, and/or cyber-shoplifting activity, which occurred on an account, which may be identified in the respective charge-back information report, or any other respective information which may be contained in the respective stopping of payment information report or non-payment(s) due to insufficient funds information report.

The merchant can then utilize the report information in order to determine either not to proceed with the transaction, to cancel the transaction or order, to request additional information, to request information to confirm and/or verify the transaction and the account holder's or the account owner's authority to enter into the transaction, to request additional assurances from the account holder or account owner, to secure the account holder's or the account owner's agreement not to dispute a charge or payment, to secure the account holder's or the account owner's agreement not to stop payment for a charge or payment, to secure the account holder's or the account owner's guarantee that sufficient funds exist to cover a payment, to secure the account holder's or the account owner's alternate agreement to guarantee payment for a charge, to secure a release of liability or claim from the account holder or account owner regarding the transaction, and/or the merchant can take any other action in order to protect its interests, prior to shipping, transferring, or delivering, the respective goods, products, and/or services, and/or otherwise fulfill the order or merchant's obligations relating to the transaction, or prior to a providing of a service.

Thereafter, the operation of the apparatus 100 will cease at step 409.

In another preferred embodiment, the apparatus 100 and method of the present invention can be utilized in order to provide information to an individual, entity, merchant, vendor, or provider, regarding charge-backs, stopping of payments, non-payments due to insufficient funds, failures to make payments, or fraudulent activities, occurring on, or which have occurred in, on, or in connection with, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, of an individual or entity with whom the respective individual, entity, merchant, vendor, or provider, is currently engaging in a transaction.

In another preferred embodiment, the apparatus 100 and method of the present invention can be utilized in order to provide transaction history information, account history information, and/or charge-back information, or individual information, or any other of the herein-described information, including, but not limited to, the above-described charge-back, check stopping of payment, or check bouncing, information, or fraudulent activity, regarding any of the herein-described accounts, policies, plans, or programs, during a transaction authorization process, prior to a transaction authorization process, subsequent to transaction authorization process, and/or prior to a goods, products, and/or services, shipment and/or delivery, or prior to a providing of a service.

In another preferred embodiment, the apparatus 100 and method of the present invention can also be utilized in conjunction with a transaction process and/or a transaction authorization process.

Figure 5:
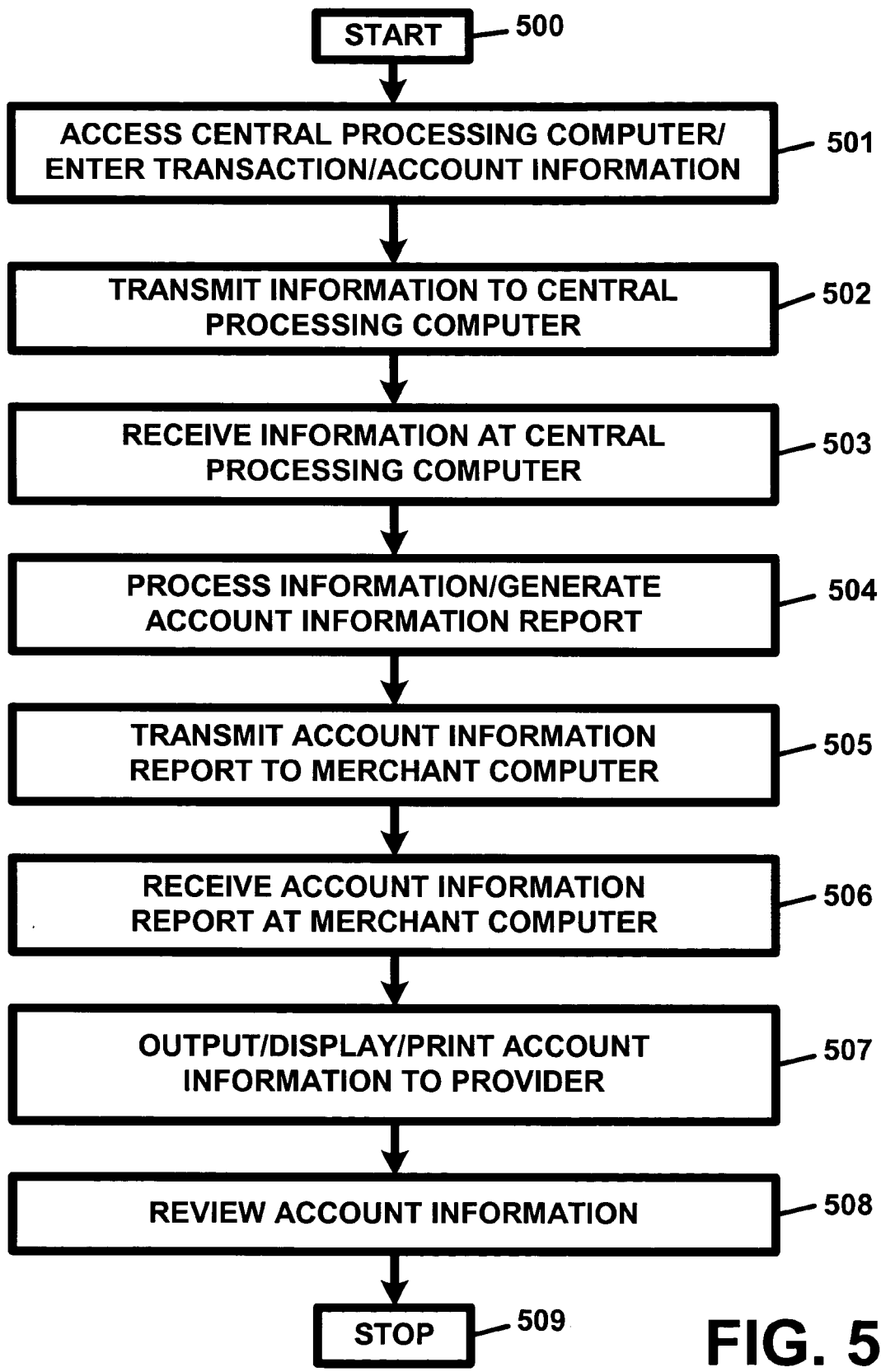
FIG. 5 illustrates another preferred embodiment method for utilizing the apparatus of FIG. 1, in flow diagram form.

FIG. 5 illustrates another preferred embodiment method for utilizing the apparatus 100 of the present invention, in flow diagram form. In the embodiment of FIG. 5, the apparatus 100 of the present invention can be utilized in order to provide information to an individual, entity, merchant, vendor, or provider, regarding a charge-back(s), a stopping of payment(s), and/or a non-payment(s) due to insufficient funds, or a previous fraudulent activity or fraudulent activity, occurring on, or which has occurred on, in conjunction with, and/or relating to, any of the herein-described accounts. In this regard, the apparatus and method of the embodiment of FIG. 5 can be utilized to provide information regarding charge-backs, stopping of payments, non-payment due to insufficient funds, or fraudulent activity or fraudulent activities, occurring on, or which have occurred on, in conjunction with, and/or relating to, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

For purposes of illustration, and as an example, the embodiment of FIG. 5 will be described as being utilized in order to provide information regarding charge-backs which have occurred on, in conjunction with, and/or relating to a healthcare insurance account. It is, however, important to note that the apparatus 100 and method of FIG. 5 can be utilized in a same, in a similar, and/or in an analogous, manner in order to provide information regarding stopping of payments, non-payments due to insufficient funds, or fraudulent activity or activities involving a healthcare insurance account, or in order to provide information regarding charge-backs, stopping of payments, non-payments due to insufficient funds, or fraudulent activity or activities involving, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

With reference to FIG. 5, the operation of the apparatus 100 commences at step 500. At step 501, an individual, entity, merchant, vendor, or provider (hereinafter referred to as "provider"), who is engaged in a transaction with another individual, who is utilizing an account card or an account identifier associated with the healthcare insurance account (hereinafter referred to as "the account") in order to effect payment for a transaction involving any type or kind of goods, products, and/or services, can access the central processing computer 10 via, and by using, a merchant computer 20.

At step 501, the provider can access the central processing computer 10 and enter information regarding the transaction and/or information regarding the account presented for payment, into the merchant computer 20 associated with the provider. The information can, for example, be entered into a transaction authorization device which can be utilized as a merchant computer 20. At step 502, the information entered into the merchant computer 20, at step 501, is transmitted to the central processing computer 10.

At step 503, the central processing computer 10 will receive the information. At step 504, the central processing computer 10 will process the information received, at step 503, in conjunction with the information stored in the database 10H. At step 504, the central processing computer 10 will generate a charge-back information report.

The charge-back information report can contain any of the herein-described information which is stored in the database 10H. The charge-back information report can, for example, contain information regarding the number and frequency of charge-backs which have occurred on the respective account, the reasons for the charge-back action, allegations made by the account holder or account owner, dispute allegations made by the account holder or account owner, allegations of fraudulent or unauthorized account activity made by the account holder or account owner, the basis for any of the above-described allegations, allegations or responses made by the individuals, entities, merchants, vendors, or providers, involved in the transactions in question, transactions amounts involved, probability or statistical information regarding whether the account holder or account owner can be a charge-back risk in the present transaction, and/or any other information regarding charge-back(s) which have occurred on the respective account, which can or which may be useful to and/or of interest to an individual, entity, merchant, vendor, or provider, in assessing whether or not the present transaction may present a charge-back risk.

The charge-back information report can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The charge-back information report can also contain information regarding fraudulent activity involving the account or allegations of fraudulent activity involving the account.

The charge-back information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The charge-back information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The charge-back information report can also contain information regarding information which is missing and/or not available at the time of report generation.

In the case when the apparatus 100 is utilized to provide stopping of payment information or information regarding non-payment(s) due to insufficient funds, the central processing computer 10 will, at step 504, process the information regarding the respective transaction and information regarding the respective account in conjunction with the information stored in the database 10H and generate a stopping of payment information report or non-payment(s) due to insufficient funds information report containing stopping of payment information or information regarding non-payment(s) due to insufficient funds.

The stopping of payment information report or non-payment(s) due to insufficient funds information report can contain any of the herein-described information which is stored in the database 10H. The stopping of payment information report or non-payment(s) due to insufficient funds information report can, for example, contain information regarding the number and frequency of respective stopping of payment(s) or non-payment(s) due to insufficient funds which have occurred on the respective account, the reasons for the respective stopping of payment(s) or non-payment(s) due to insufficient funds, allegations made by the account holder or account owner, dispute allegations made by the account holder or account owner, allegations of fraudulent or unauthorized account activity made by the account holder or account owner, the basis for any of the above-described allegations, allegations or responses made by the individuals, entities, merchants, vendors, or providers, involved in the transactions in question, transactions amounts involved, probability or statistical information regarding whether the account holder or account owner can be a respective stopping of payment(s) risk or non-payment(s) due to insufficient funds risk in the present transaction, and/or any other information regarding respective stopping of payment(s) or non-payment(s) due to insufficient funds which have occurred on the respective account, which can or which may be useful to and/or of interest to an individual, entity, merchant, vendor, or provider, in assessing whether or not the present transaction may present a respective stopping of payment(s) risk or non-payment(s) due to insufficient funds risk.

The stopping of payment information report or non-payment(s) due to insufficient funds information report can also contain any of the herein-described unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The stopping of payment information report or non-payment(s) due to insufficient funds information report can also contain any one or more of the herein-described information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The stopping of payment information report or non-payment(s) due to insufficient funds information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The stopping of payment information report or non-payment(s) due to insufficient funds information report can also contain information regarding information which is missing and/or not available at the time of report generation.

The stopping of payment information report or non-payment(s) due to insufficient funds information report can also contain information regarding fraudulent activity involving the account or allegations of fraudulent activity involving the account.

In this regard, the apparatus 100 and method of the present invention can provide a wide variety of information regarding an individual involved in a transaction, to a respective individual, entity, merchant, vendor, or provider, of a good, product, or service.

At step 505, the central processing computer 10 can transmit the charge-back information report (or the respective stopping of payment information report or non-payment(s) due to insufficient funds information report, if applicable) to the merchant computer 20. The charge-back information report (or the respective stopping of payment information report or non-payment(s) due to insufficient funds information report, if applicable) can also be transmitted to the provider or to the merchant computer 20 as any one or more of an e-mail message, an instant messaging message, a short message, a beeper message, a pager message, a telephone message, a recorded voice message, and/or any other electronic message or electronic transmission.

At step 506, the merchant computer 20 can receive the charge-back information report (or the respective stopping of payment information report or non-payment(s) due to insufficient funds information report, if applicable).

At step 507, the information provided and/or contained in the charge-back information report (or the respective stopping of payment information report or non-payment(s) due to insufficient funds information report, if applicable) can be displayed to the provider or the provider's employee or agent, can be output or printed out, and/or can otherwise be provided to the provider or the provider's employee or agent.

At step 508, the provider or the provider's employee or agent can review the information contained in the charge-back information report (or the respective stopping of payment information report or non-payment(s) due to insufficient funds information report, if applicable) and determine whether or not to proceed to engage in the transaction, to proceed to process the transaction, to proceed to consummate the transaction, or to cancel the transaction. In this manner, for example, a provider can be apprised of past disputes, denials, fraudulent use allegations, charge-back impositions, and/or other activity of interest, which occurred on an account, which may be identified in the charge-back information report (or the respective stopping of payment information report or non-payment(s) due to insufficient funds information report, if applicable).

The provider can then utilize the report information in order to determine either not to proceed with the transaction, to cancel the transaction or order, to request additional information, to request information to confirm and/or verify the transaction and the account holder's or the account owner's authority to enter into the transaction, to request additional assurances from the account holder or account owner, to secure the account holder's or the account owner's agreement not to dispute a charge or payment, to secure the account holder's or the account owner's agreement not to stop payment for a charge or payment, to secure the account holder's or the account owner's guarantee that sufficient funds exist to cover a payment, to secure the account holder's or the account owner's alternate agreement to guarantee payment for a charge, to secure a release of liability or claim from the account holder or account owner regarding the transaction, and/or the provider can take any other action in order to protect its interests.

Thereafter, the operation of the apparatus 100 will cease at step 509.

In this manner, the apparatus 100 can be utilized in order to allow an individual, entity, merchant, vendor, or provider, to reduce its risks and/or to otherwise protect its interests.

In a same, similar, and/or analogous, manner, the preferred embodiment of FIG. 5 can also be utilized in connection with a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

In another preferred embodiment, the apparatus 100 and method of the present invention can be utilized in order to provide information to an individual, entity, merchant, vendor, or provider, regarding charge-backs, stopping of payments, non-payments due to insufficient funds, failures to make payments, or fraudulent activities, occurring on, or which have occurred in, on, or in connection with, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, of an individual or entity with whom the respective individual, entity, merchant, vendor, or provider, is currently engaging in a transaction, at any time prior to a pre-specified time in order to allow the individual, entity, merchant, vendor, or provider, to receive and review the information subsequent to the transaction, but prior to providing, delivering, transferring, or shipping, the respective goods, products, or services, to a recipient pursuant to a transaction. In this regard, the information can be provided to the individual, entity, merchant, vendor, or provider, at any time prior to a pre-specified time in order to allow the individual, entity, merchant, vendor, or provider, to receive and review the information subsequent to the transaction, but prior to providing a service, or delivering, transferring, or shipping, the respective goods, products, or services, to a recipient pursuant to a transaction.

In this manner, for example, a provider can process a transaction, and provide information regarding a date of a providing of a service, a providing date or a shipping date of a good or product, or a delivery date of a product or a service, and receive the requested information prior to the date of the providing of the service, the providing date or the shipping date of the good or product, or the delivery date of the product or the service.

For example, in the case of a services provider, a provider who or which is about to provide a service, or who or which has been requested to provide a service in the future, or any other individual, entity, merchant, vendor, or other provider, can request and be provided with transaction history information, account history information, and/or charge-back information, or individual information, or any of the herein-described information, regarding the respective account, the individual, or the account holder or account owner, prior to providing a service, or prior to a providing, delivering, transferring, or shipping, of the respective goods, products, or services, to a recipient pursuant to a transaction, thereby giving the individual, entity, merchant, vendor, or provider, the opportunity to utilize the report information in order to determine either not to proceed with the transaction, to request additional information, to request information to confirm and/or verify the transaction and the account holder's or the account owner's authority to enter into the transaction, to request additional assurances from the account holder or account owner, to secure the account holder's or the account owner's agreement not to dispute a charge or payment, to secure the account holder's or the account owner's agreement not to stop payment for a charge or payment, to secure the account holder's or the account owner's guarantee that sufficient funds exist to cover a payment, to secure the account holder's or the account owner's alternate agreement to guarantee payment for a charge, to secure a release of liability or claim from the account holder or account owner regarding the transaction, and/or the individual, entity, merchant, vendor, or provider, can take any other action in order to protect its interests.

In this manner, the apparatus 100 can be utilized in order to allow an individual, entity, merchant, vendor, or provider, to reduce charge-back or non-payment risks, and/or to otherwise protect its interests.

Figure 6:
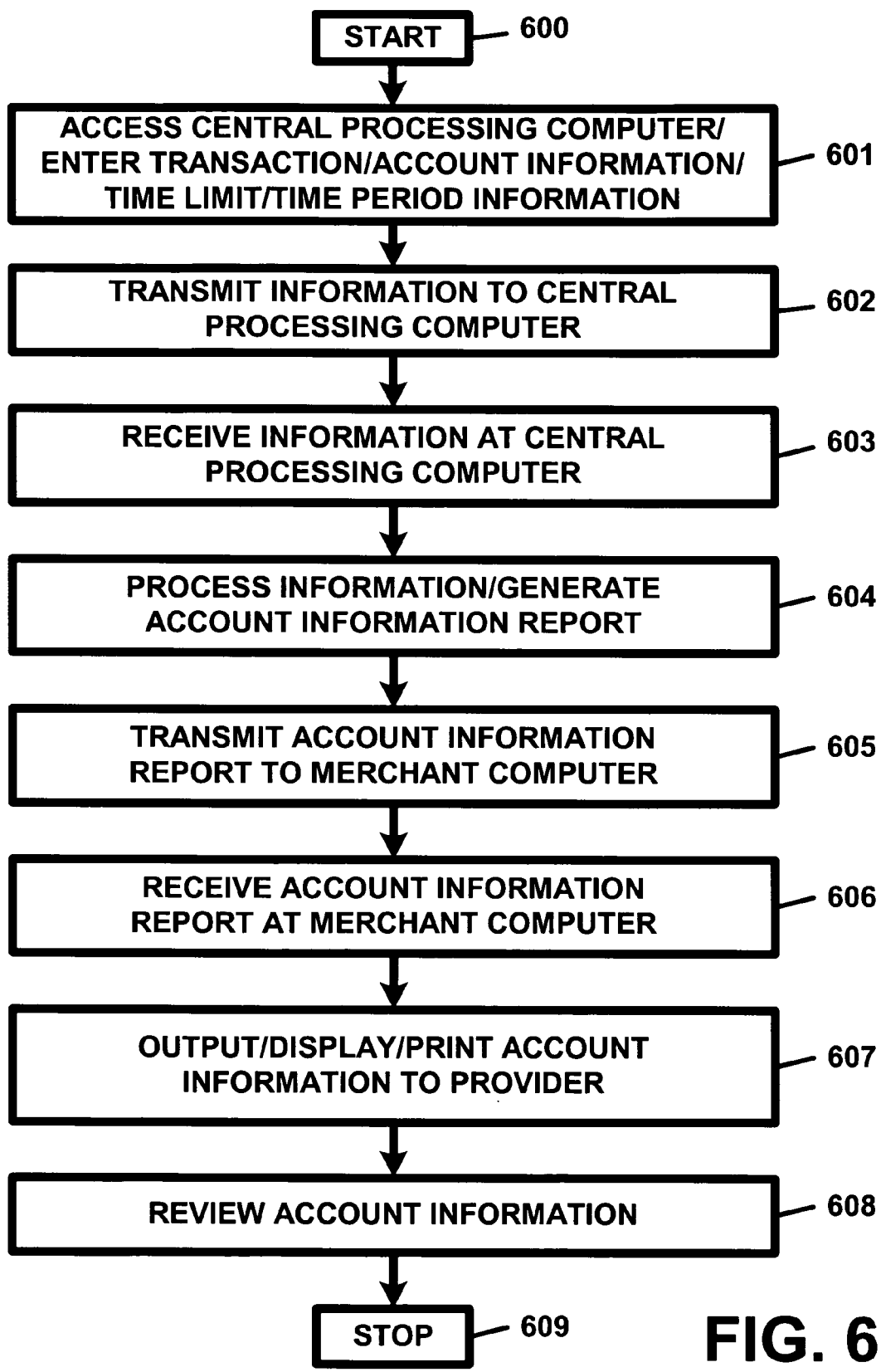
FIG. 6 illustrates another preferred embodiment method for utilizing the apparatus of FIG. 1, in flow diagram form.

FIG. 6 illustrates another preferred embodiment method for utilizing the apparatus 100 of the present invention, in flow diagram form. In the embodiment of FIG. 6, the apparatus 100 of the present invention can be utilized in order to provide information to an individual, entity, merchant, vendor, or provider, regarding a charge-back(s), a stopping of payment(s), and/or a non-payment(s) due to insufficient funds, or other information regarding any activity or activities which have occurred on, involving, in connection with, and/or relating to, any of the herein-described accounts, or any of the herein-described policies, plans, or programs, at any time prior to a providing of a service, or prior to a providing date or a shipping date of a good or product, or a delivery date of a product or a service.

In the embodiment of FIG. 6, the apparatus 100 of the present invention can be utilized in order to provide information to an individual, entity, merchant, vendor, or provider, regarding a charge-back(s), a stopping of payment(s), and/or a non-payment(s) due to insufficient funds, or a previous fraudulent activity or fraudulent activity, occurring on, or which has occurred on, in conjunction with, and/or relating to, any of the herein-described accounts. In this regard, the apparatus and method of the embodiment of FIG. 6 can be utilized to provide information regarding charge-backs, stopping of payments, non-payment due to insufficient funds, or fraudulent activity or fraudulent activities, occurring on, or which have occurred on, in conjunction with, and/or relating to, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

For purposes of illustration, and as an example, the embodiment of FIG. 6 will be described as being utilized in order to provide information regarding charge-backs which have occurred on, in conjunction with, and/or relating to a healthcare insurance account. It is, however, important to note that the apparatus 100 and method of FIG. 6 can be utilized in a same, in a similar, and/or in an analogous, manner in order to provide information regarding stopping of payments, non-payments due to insufficient funds, or fraudulent activity or activities involving a healthcare insurance account, or in order to provide information regarding charge-backs, stopping of payments, non-payments due to insufficient funds, or fraudulent activity or activities involving, a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

With reference to FIG. 6, the operation of the apparatus 100 commences at step 600. At step 601, an individual, entity, merchant, vendor, or provider (hereinafter referred to as "provider"), who is engaged in a transaction with another individual, who is utilizing an account card or an account identifier associated with the healthcare insurance account (hereinafter referred to as "the account") in order to effect payment for a transaction involving any type or kind of goods, products, and/or services, can access the central processing computer 10 via, and by using, a merchant computer 20.

At step 601, the provider can access the central processing computer 10 and enter information regarding the transaction and/or information regarding the account presented for payment, into the merchant computer 20 associated with the provider. The provider, at step 601, can also enter information regarding its providing of services, its providing of its goods or products, or its shipping, transferring, or delivery, policies, including the time period (i.e. hours, days, etc.) which typically elapses in between a provider providing a service after a request, providing goods or products after an order is placed or a request is made, or its taking an order or processing an order and shipping, transferring, or delivering, the goods, products, or services, which are the subject of the transaction, and/or otherwise fulfilling the request, order, or obligations under or pursuant to the transaction. The provider can also enter information regarding the providing, shipping, transferring, and/or delivery, date and/or time, for the providing, the shipping, the transferring, and/or the delivery, of the good(s), product(s), or service(s). The provider can also enter a time limit or time period for receiving the information report.

The information can, for example, be entered into a transaction authorization device which can be utilized as a merchant computer 20. At step 602, the information entered into the merchant computer 20, at step 601, is transmitted to the central processing computer 10.

At step 603, the central processing computer 10 will receive the information. At step 604, the central processing computer 10 will process the information received, at step 603, in conjunction with the information stored in the database 10H. At step 604, the central processing computer 10 will generate the charge-back information report immediately and/or at any time prior to the time limit specified by the provider for receiving the report and/or prior to the providing of the service after a request, the providing of the goods or products after an order is placed or a request has been made, or the taking of an order or the processing of an order and the shipping, transferring, or delivering, of the goods, products, or services, which are the subject of the transaction, and/or the fulfilling of the request, order, or obligations under or pursuant to the transaction.

If the central processing computer 10 has sufficient information for generating the charge-back information report, the central processing computer 10 can generate the charge-back information report. If the central processing computer 10 does not have all of the information for generating the charge-back information report, the central processing computer 10 can generate the charge-back information report at any time after it receives the information, but prior to the elapsing of the provider-defined time limit or time period.

In any of the embodiments described herein, the central processing computer 10 can be programmed to check the information stored in the database 10H, at specific and/or various time intervals, in order to determine if the needed information has been provided and/or has been made available for processing and generating the charge-back information report information.

The central processing computer 10 can generate the charge-back information report upon getting the needed information. If the needed information is not available prior to the elapsing of the time limit or time period, the central processing computer 10 can generate a charge-back information report containing any available information and provide information regarding which information is missing or is not available.

The charge-back information report can contain any of the herein-described information which is stored in the database 10H. The charge-back information report can, for example, contain information regarding the number and frequency of charge-backs which have occurred on the respective account, which account can be any one or more of a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program. The charge-back information report can also contain information regarding the reasons for the charge-back action, allegations made by the account holder or account owner, dispute allegations made by the account holder or account owner, allegations of fraudulent or unauthorized account activity made by the account holder or account owner, the basis for any of the above-described allegations, allegations or responses made by the individuals, entities, merchants, vendors, or providers, involved in the transactions in question, transactions amounts involved, probability or statistical information regarding whether the account holder or account owner can be a charge-back risk in the present transaction, and/or any other information regarding charge-back(s) which have occurred on the respective account, which can or which may be useful to and/or of interest to an individual, entity, merchant, vendor, or provider, in assessing whether or not the present transaction may present a charge-back risk.

The charge-back information report can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The charge-back information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The charge-back information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The charge-back information report can also contain information regarding information which is missing and/or not available at the time of report generation.

In any and/or all of the embodiments described herein, the central processing computer 10 can be programmed to automatically generate, and/or to automatically transmit to the merchant computer 20, a new or updated charge-back information report or new or updated charge-back information reports, within the provider-defined time limit or time period, upon detecting or determining that new information, previously unavailable information, or missing information, is, or has been made, available in the database 10H. In this regard, the provider can be automatically provided with one or more new or updated charge-back information reports within or during the provider-defined time limit or time period, or prior to or before the date and/or time for the providing, the shipping, the transferring, and/or the delivery, of the good(s), product(s), or service(s).

In the case when the apparatus 100 is utilized to provide stopping of payment information or information regarding non-payment(s) due to insufficient funds, such as in the case of check payments, debit payments, electronic money payments, and/or other payments, the central processing computer 10 will, at step 604, process the information regarding the respective transaction and information regarding the respective account in conjunction with the information stored in the database 10H and generate a respective stopping of payment information report or non-payment(s) due to insufficient funds information report.

The respective stopping of payment(s) report or non-payment(s) due to insufficient funds information report can contain any of the herein-described information which is stored in the database 10H. The respective stopping of payment(s) information report or non-payment(s) due to insufficient funds information report can, for example, contain information regarding the number and frequency of respective stopping of payment(s) or non-payment(s) due to insufficient funds which have occurred on the respective account, the reasons for the respective stopping of payment(s) or non-payment(s) due to insufficient funds, allegations made by the account holder or account owner, dispute allegations made by the account holder or account owner, allegations of fraudulent or unauthorized account activity made by the account holder or account owner, the basis for any of the above-described allegations, allegations or responses made by the individuals, entities, merchants, vendors, or providers, involved in the transactions in question, transactions amounts involved, probability or statistical information regarding whether the account holder or account owner can be a respective stopping of payment(s) risk or non-payment(s) due to insufficient funds risk in the present transaction, and/or any other information regarding respective stopping of payment(s) or non-payment(s) due to insufficient funds which have occurred on the respective account, which can or which may be useful to and/or of interest to an individual, entity, merchant, vendor, or provider, in assessing whether or not the present transaction may present a respective stopping of payment(s) risk or non-payment(s) due to insufficient funds risk, or other non-payment risk.

The respective stopping of payment(s) information report or non-payment(s) due to insufficient funds information report can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The respective stopping of payment(s) information report or non-payment(s) due to insufficient funds information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The respective stopping of payment(s) information report or non-payment(s) due to insufficient funds information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The respective stopping of payment(s) information report or non-payment(s) due to insufficient information funds information report can also contain information regarding information which is missing and/or not available at the time of report generation.

In any and/or all of the embodiments described herein, the central processing computer 10 can be programmed to automatically generate, and/or to automatically transmit to the merchant computer 20, a new or updated stopping of payment(s) information report or a new or updated non-payment(s) due to insufficient funds information report, or new or updated stopping of payment(s) information reports or new or updated non-payment(s) due to insufficient funds information reports, within the provider-defined time limit or time period, upon detecting or determining that new information, previously unavailable information, or missing information, is, or has been made, available in the database 10H. In this regard, the provider can be automatically provided with one or more new or updated stopping of payment(s) information reports or with one or more new or updated non-payment(s) due to insufficient funds information reports within or during the provider-defined time limit or time period, or prior to or before the date and/or time for the providing, the shipping, the transferring, and/or the delivery, of the good(s), product(s), or service(s).

In this regard, the apparatus 100 and method of the present invention can provide a wide variety of information regarding an individual or the account involved in a transaction, to a respective individual, entity, merchant, vendor, or provider of any type or kind of a good, product, or service.

At step 605, the central processing computer 10 can transmit the charge-back information report (or the respective stopping of payment information report or non-payment(s) due to insufficient funds information report, if applicable), to the merchant computer 20. The charge-back information report (or the respective stopping of payment information report or non-payment(s) due to insufficient funds information report, if applicable) can also be transmitted to the provider or to the merchant computer 20 as any one or more of an e-mail message, an instant messaging message, a short message, a beeper message, a pager message, a telephone message, a recorded voice message, and/or any other electronic message or electronic transmission.

At step 606, the merchant computer 20 can receive the charge-back information report (or the respective stopping of payment information report or non-payment(s) due to insufficient funds information report, if applicable).

At step 607, the information provided and/or contained in the charge-back information report (or the respective stopping of payment information report or non-payment(s) due to insufficient funds information report, if applicable) can be displayed to the provider or the provider's employee or agent, can be output or printed out, and/or can otherwise be provided to the provider or the provider's employee or agent.

At step 608, the provider or the provider's employee or agent can review the information contained in the charge-back information report (or the respective stopping of payment information report or non-payment(s) due to insufficient funds information report, if applicable) and determine whether or not to proceed to engage in the transaction, to proceed to process the transaction, to proceed to consummate the transaction, or to cancel the transaction. In this manner, for example, a provider can be apprised of past disputes, denials, fraudulent use allegations, charge-back impositions, and/or other activity of interest, occurring on, or which has occurred on an account, which may be identified in the charge-back information report (or the respective stopping of payment information report or non-payment(s) due to insufficient funds information report, if applicable).

The provider can then utilize the report information in order to determine either not to proceed with the transaction, to cancel the transaction or order, to request additional information, to request information to confirm and/or verify the transaction and the account holder's or the account owner's authority to enter into the transaction, to request additional assurances from the account holder or account owner, to secure the account holder's or the account owner's agreement not to dispute a charge or payment, to secure the account holder's or the account owner's agreement not to stop payment for a charge or payment, to secure the account holder's or the account owner's guarantee that sufficient funds exist to cover a payment, to secure the account holder's or the account owner's alternate agreement to guarantee payment for a charge, to secure a release of liability or claim from the account holder or account owner regarding the transaction, and/or the provider can take any other action in order to protect its interests, prior to providing a service, or prior to delivering, transferring, or shipping, the respective goods, products, or services, to a recipient pursuant to a transaction.

Thereafter, the operation of the apparatus 100 will cease at step 609.

In this manner, the apparatus 100 can be utilized in order to allow an individual, entity, merchant, vendor, or provider, to reduce its risks and/or to otherwise protect its interests, prior to providing a service, or prior to delivering, transferring, or shipping, the respective goods, products, or services, to a recipient pursuant to a transaction.

In a same, similar, and/or analogous, manner, the preferred embodiment of FIG. 6 can also be utilized in connection with a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

In another preferred embodiment, the apparatus and method of the present invention can be utilized in conjunction with, and/or along with, a transaction authorization process involving any of the herein-described accounts, plans, policies, or programs.

Figure 7A:
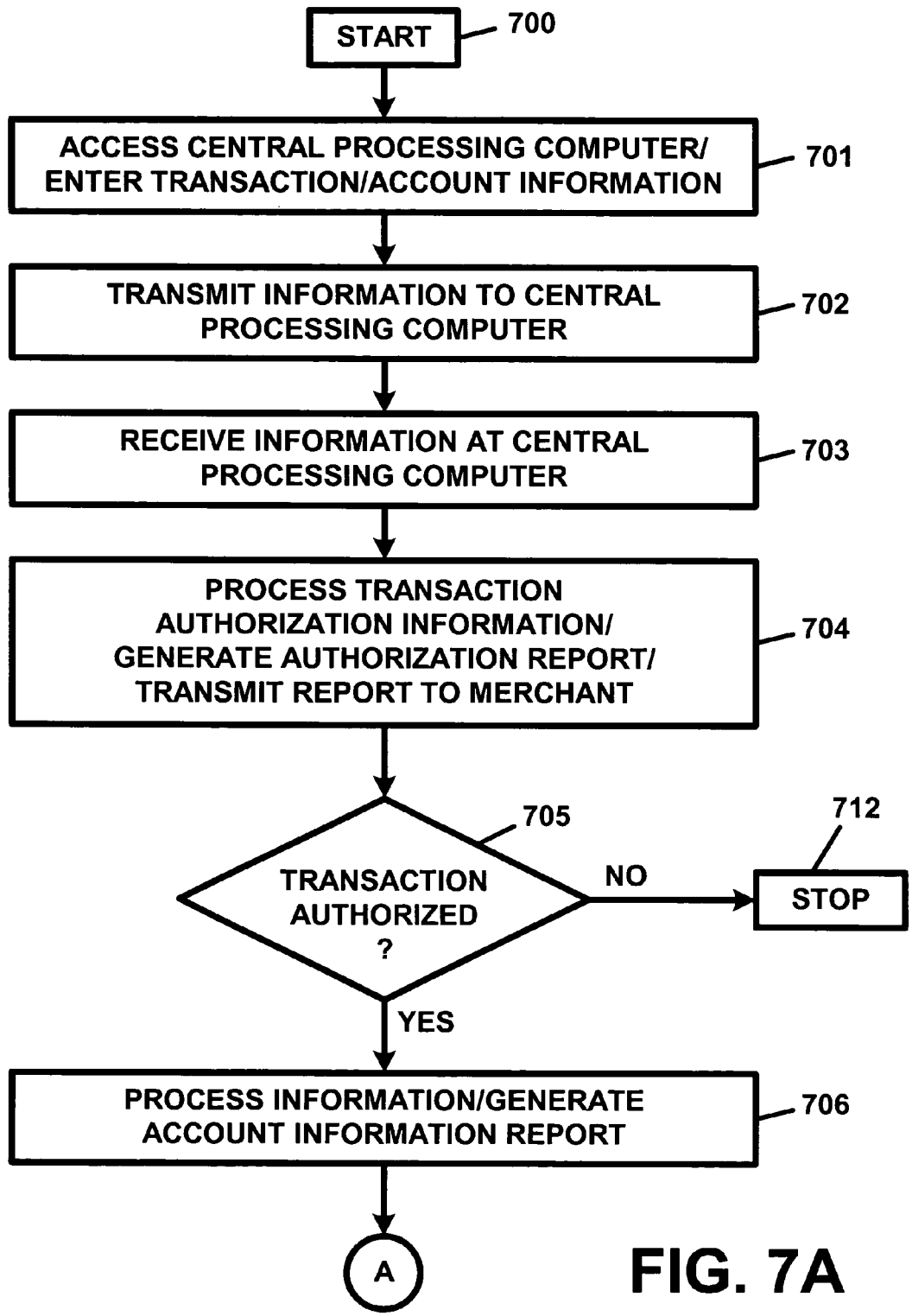
FIGS. 7A and 7B illustrate another preferred embodiment method for utilizing the apparatus of FIG. 1, in flow diagram form.
Figure 7B:
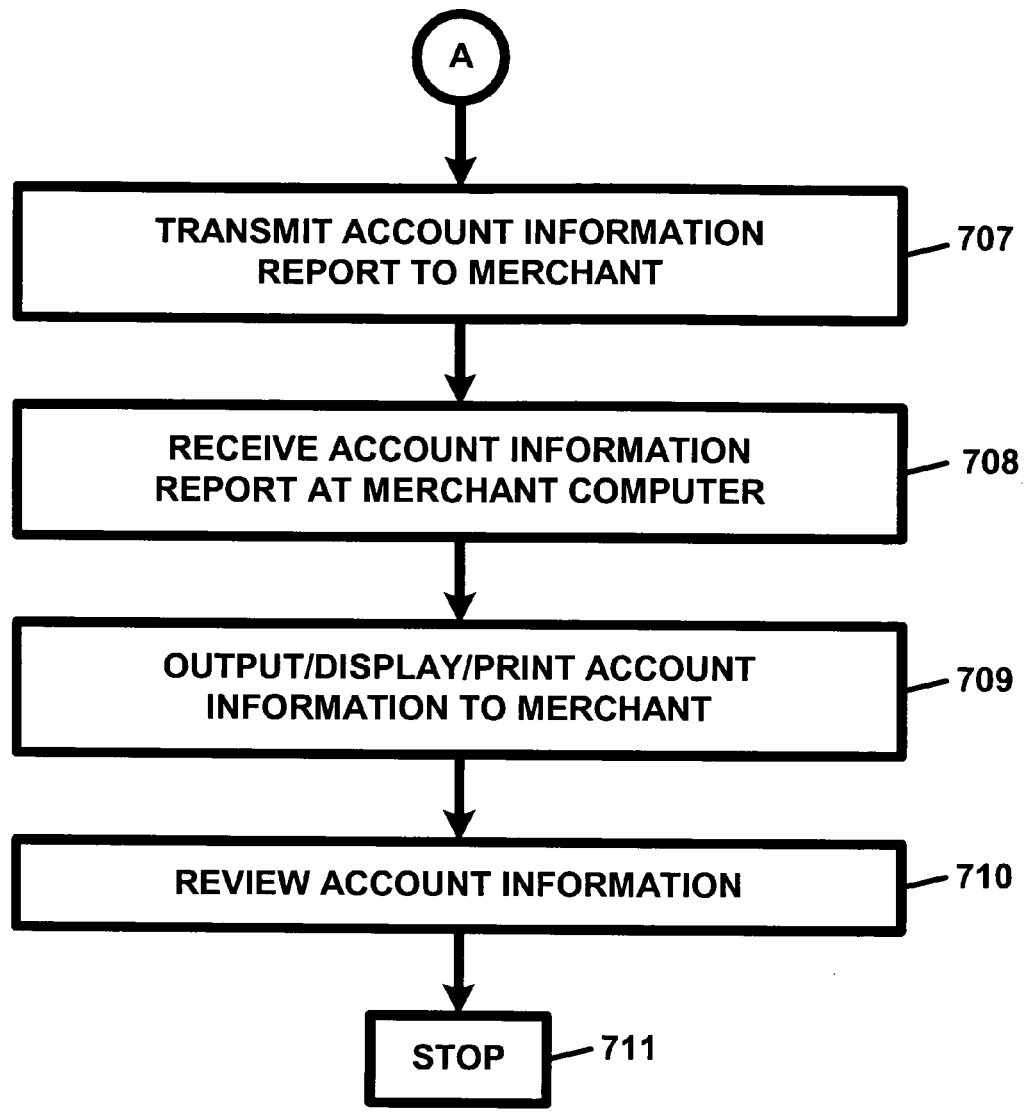

FIGS. 7A and 7B illustrate another preferred embodiment method for utilizing the apparatus 100 of the present invention, in flow diagram form. In the embodiment of FIGS. 7A and 7B, the apparatus 100 of the present invention can be utilized in order to provide information to a merchant, vendor, or provider, regarding a charge-back(s), a stopping of payment(s), and/or a non-payment(s) due to insufficient funds, or any of the herein-described information described as being provided by the apparatus 100 and method of the present invention, or any other information regarding activities or occurrences occurring on, or which have occurred on, in conjunction with, and/or relating to, any of the herein-described accounts, in conjunction with, and/or in connection with a transaction authorization process.

The embodiment of FIGS. 7A and 7B can be utilized to provide information regarding charge-backs which have occurred on, in conjunction with, and/or relating to, credit card accounts, credit accounts, charge card accounts, charge accounts, debit card accounts, debit accounts, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to, any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

The embodiment of FIGS. 7A and 7B can also be utilized in order to provide information regarding stopping of payments which have occurred on, in conjunction with, and/or relating to, credit card accounts, credit accounts, charge card accounts, charge accounts, debit card accounts, debit accounts, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts The embodiment of FIGS. 7A and 7B can also be utilized in order to provide information regarding non-payment due to insufficient funds which have occurred on, in conjunction with, and/or relating to, credit card accounts, credit accounts, charge card accounts, charge accounts, debit card accounts, debit accounts, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

The embodiment of FIGS. 7A and 7B will be described as being utilized in order to provide information regarding charge-backs which have occurred on, in conjunction with, and/or relating to a credit card account or a charge card account. The embodiment of FIGS. 7A and 7B can also be utilized in a same, in a similar, and/or in an analogous manner, in order to provide any one or more of information regarding charge-backs, information regarding stopping of payments, and/or information regarding non-payment due to insufficient funds, which have occurred on, in conjunction with, and/or relating to any one or more of credit card accounts, credit accounts, charge card accounts, charge accounts, debit card accounts, debit accounts, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts With reference to FIGS. 7A and 7B, the operation of the apparatus 100 commences at step 700. At step 701, a merchant who is engaged in a transaction with an individual, who is utilizing a credit card account or a charge card account to effect payment for a transaction involving any type or kind of goods, products, and/or services, can access the central processing computer 10 via a merchant computer 20.

At step 701, the merchant can access the central processing computer 10 and enter information regarding the transaction and/or information regarding the credit card account or the charge card account which the individual has presented for payment, into the merchant computer 20 associated with the merchant. The information can, for example, be entered into a transaction authorization device which can be utilized as a merchant computer 20. At step 702, the information entered into the merchant computer 20, at step 701, is transmitted to the central processing computer 10.

At step 703, the central processing computer 10 will receive the information. At step 704, the central processing computer 10 will process the information received, at step 703, and determine if the transaction is authorized. At step 704, the central processing computer 10 will generate a transaction authorization report and transmit same to the merchant computer 20 for review by the merchant. The transaction authorization report can also be transmitted to the merchant or to the merchant computer 20 as any one or more of an e-mail message, an instant messaging message, a short message, a beeper message, a pager message, a telephone message, a recorded voice message, and/or any other electronic message or electronic transmission.

The transaction authorization report can contain information regarding whether the transaction is authorized or that the transaction is not authorized.

At step 705, the central processing computer 10 will determine whether the transaction is authorized. If, at step 705, the central processing computer 10 determines that the transaction is authorized, the operation of the central processing computer 10 will proceed to step 706. If, however, the central processing computer 10 determines, at step 705, that the transaction is not authorized, the operation of the central processing computer 10 will cease at step 712.

At step 706, the central processing computer 10 will process the information received, at step 703, in conjunction with the information stored in the database 10H. At step 706, the central processing computer 10 will generate a charge-back information report.

The charge-back information report can contain any of the herein-described information which is stored in the database 10H. The charge-back information report can, for example, contain information regarding the number and frequency of charge-backs which have occurred on the respective credit card account or charge card account, the reasons for the charge-back action, allegations made by the account holder or account owner, dispute allegations made by the account holder or account owner, allegations of fraudulent or unauthorized account activity made by the account holder or account owner, the basis for any of the above-described allegations, allegations or responses made by the merchants, vendors, or providers, involved in the transactions in question, transactions amounts involved, probability or statistical information regarding whether the account holder or account owner can be a charge-back risk in the present transaction, and/or any other information regarding charge-back(s) which have occurred on the respective account, which can or which may be useful to and/or of interest to a merchant, vendor, or provider, in assessing whether or not the present transaction may present a charge-back risk.

The charge-back information report, in addition to containing any of the information described herein as being included in a charge-back information report in any of the embodiments described herein or any of the information described herein as being stored in the database 10H, can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The charge-back information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The charge-back information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The charge-back information report can also contain information regarding information which is missing and/or not available at the time of report generation.

In the case when the apparatus 100 is utilized to provide stopping of payment information or information regarding non-payment(s) due to insufficient funds, such as in the case of check payments, debit payments, electronic money payments, and/or other payments, the central processing computer 10 will, at step 706, process the information regarding the respective transaction and information regarding the respective account in conjunction with the information stored in the database 10H and generate a respective stopping of payment information report or non-payment(s) due to insufficient funds information report.

The respective stopping of payment(s) report or non-payment(s) due to insufficient funds information report can contain any of the herein-described information which is stored in the database 10H. The respective stopping of payment(s) report or non-payment(s) due to insufficient funds information report can, for example, contain information regarding the number and frequency of respective stopping of payment(s) or non-payment(s) due to insufficient funds which have occurred on the respective account, the reasons for the respective stopping of payment(s) or non-payment(s) due to insufficient funds, allegations made by the account holder or account owner, dispute allegations made by the account holder or account owner, allegations of fraudulent or unauthorized account activity made by the account holder or account owner, the basis for any of the above-described allegations, allegations or responses made by the merchants, vendors, or providers, involved in the transactions in question, transactions amounts involved, probability or statistical information regarding whether the account holder or account owner can be a respective stopping of payment(s) risk or non-payment(s) due to insufficient funds risk in the present transaction, and/or any other information regarding respective stopping of payment(s) or non-payment(s) due to insufficient funds which have occurred on the respective account, which can or which may be useful to and/or of interest to a merchant, vendor, or provider, in assessing whether or not the present transaction may present a respective stopping of payment(s) risk or non-payment(s) due to insufficient funds risk.

The respective stopping of payment(s) information report or non-payment(s) due to insufficient funds information report, in addition to containing any of the information described herein as being included in a respective stopping of payment(s) information report or non-payment(s) due to insufficient funds information report in any of the embodiments described herein or any of the information described herein as being stored in the database 10H, can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual involved in the transaction or the account holder or account owner of the account involved in the transaction.

The respective stopping of payment(s) information report or non-payment(s) due to insufficient funds information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual involved in the transaction or the account holder or account owner of the account involved in the transaction. The respective stopping of payment(s) information report or non-payment(s) due to insufficient funds information report can also contain information regarding a judgment(s) issued against or involving, a judgment(s) satisfied involving, or an unsatisfied judgment(s) involving, an individual, for, of, associated with, or regarding, the individual involved in the transaction or the account holder or account owner of the account involved in the transaction.

The respective stopping of payment(s) information report or non-payment(s) due to insufficient funds information report can also contain information regarding information which is missing and/or not available at the time of report generation.

In this regard, the apparatus 100 and method of the present invention can provide a wide variety of information regarding an individual involved in a transaction, to a respective merchant, vendor, or provider, of a good, product, or service.

At step 707, the central processing computer 10 can transmit the charge-back information report (or the respective stopping of payment information report or non-payment(s) due to insufficient funds information report, if applicable), to the merchant computer 20.

The charge-back information report (or the respective stopping of payment information report or non-payment(s) due to insufficient funds information report, if applicable) can also be transmitted to the merchant or to the merchant computer 20 as any one or more of an e-mail message, an instant messaging message, a short message, a beeper message, a pager message, a telephone message, a recorded voice message, and/or any other electronic message or electronic transmission.

At step 708, the merchant computer 20 can receive the charge-back information report (or the respective stopping of payment information report or non-payment(s) due to insufficient funds information report, if applicable).

At step 709, the information provided and/or contained in the charge-back information report (or the respective stopping of payment information report or non-payment(s) due to insufficient funds information report, if applicable) can be displayed to the merchant or the merchant's employee or agent, can be output or printed out, and/or can otherwise be provided to the merchant or the merchant's employee or agent.

At step 710, the merchant or the merchant's employee or agent can review the information contained in the charge-back information report (or the respective stopping of payment information report or non-payment(s) due to insufficient funds information report, if applicable) and determine whether or not to proceed to engage in the transaction, to proceed to process the transaction, to proceed to consummate the transaction, or to cancel the transaction. In this manner, for example, a merchant can be apprised of past credit card or charge card disputes, denials, fraudulent use allegations, charge-back impositions, and/or cyber-shoplifting activity, which occurred on an account, which may be identified in the respective charge-back information report, or any other respective information which may be contained in the respective stopping of payment information report or non-payment(s) due to insufficient funds information report.

The merchant can then utilize the report information in order to determine either not to proceed with the transaction, to cancel the transaction or order, to request additional information, to request information to confirm and/or verify the transaction and the account holder's or the account owner's authority to enter into the transaction, to request additional assurances from the account holder or account owner, to secure the account holder's or the account owner's agreement not to dispute a charge or payment, to secure the account holder's or the account owner's agreement not to stop payment for a charge or payment, to secure the account holder's or the account owner's guarantee that sufficient funds exist to cover a payment, to secure the account holder's or the account owner's alternate agreement to guarantee payment for a charge, to secure a release of liability or claim from the account holder or account owner regarding the transaction, and/or the merchant can take any other action in order to protect its interests.

Thereafter, the operation of the apparatus 100 will cease at step 711.

In another preferred embodiment, the apparatus 100 of FIGS. 7A and 7B, can be utilized in order to provide respective charge-back information, stopping of payment information, and/or non-payment due to insufficient funds information, or any of the other herein-described information, to a merchant, vendor, or provider, at any time prior to the merchant's, the vendor's, or the provider's, delivery, transfer, or shipment, of the respective goods, products, and/or services, to an individual, entity, account holder, or account owner, or prior to a providing of a service to an individual, entity, account holder, or account owner. In this regard, for example, the apparatus 100 can process and provide information to the merchant prior to the merchant's delivery, transfer, or shipment, of a good or product, or prior to a providing of a service, to the account holder, thereby allowing the merchant to ascertain, evaluate, and/or determine, the charge-back risks, the stopping of payment risks, and/or the non-payment due to insufficient funds risks, which exist, or which may exist, in a transaction, prior to the merchant delivering, transferring, and/or shipping, the good or product to the counterparty or account holder, or prior to a providing of a service, and/or otherwise relinquishing possession of, or title to, the good or product. In this manner, the apparatus 100 of FIGS. 7A and 7B can be utilized in order to allow a merchant, vendor, or provider, to reduce charge-back or non-payment risks and/or to otherwise protect its interests.

In a same, similar, and/or analogous, manner, the preferred embodiment of FIGS. 7A and 7B can also be utilized in connection with a bank account, a checking account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

In another preferred embodiment, the apparatus and method of the present invention can be utilized in conjunction with, and/or along with, a transaction authorization process involving any of the herein-described accounts, plans, policies, or programs.

In another preferred embodiment, the apparatus 100 and method of the present invention can be utilized in conjunction with a transaction process and/or a transaction authorization process in order to provide information regarding an individual involved in a transaction to a merchant, vendor, or provider.

Figure 8:
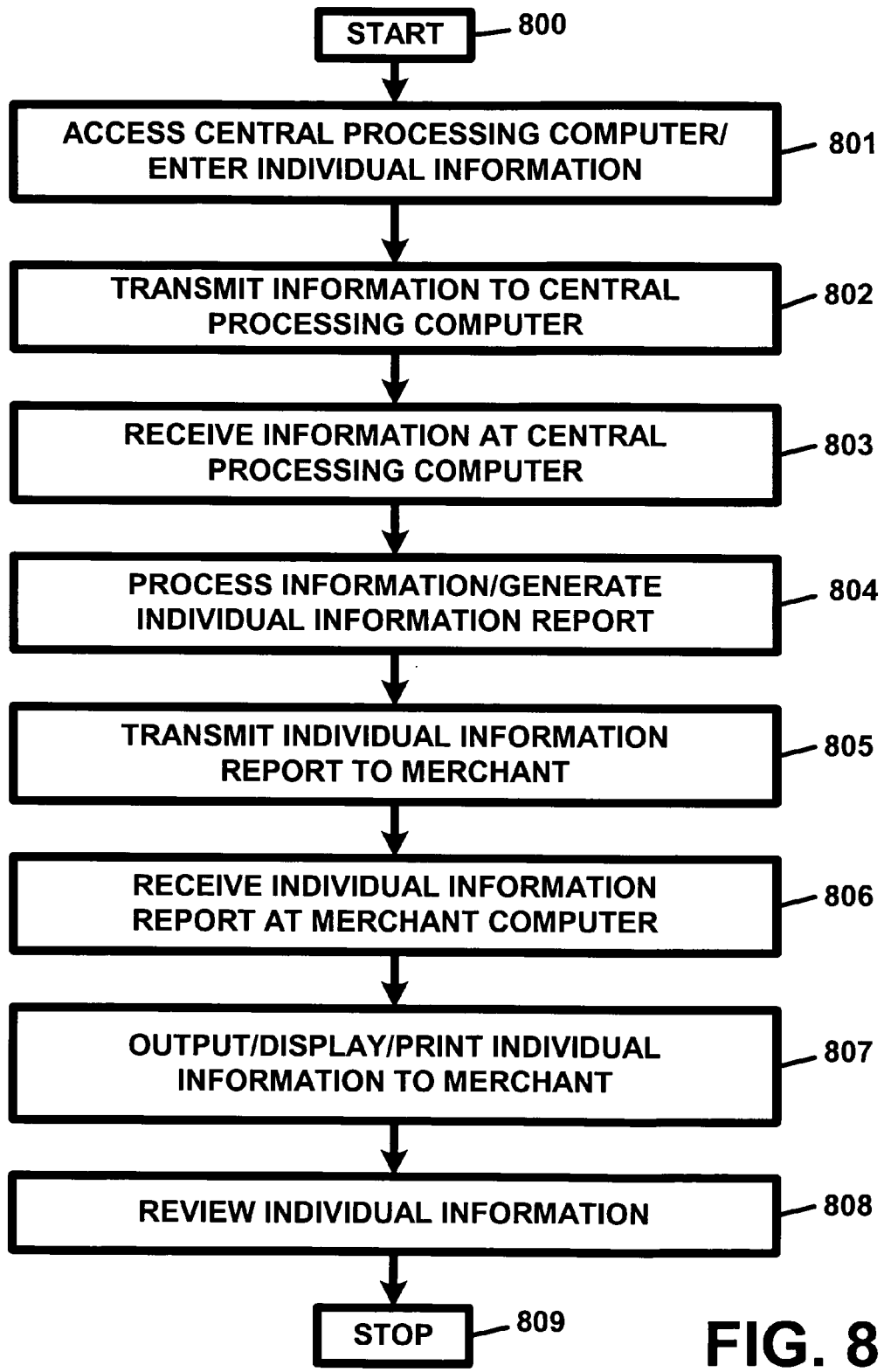
FIG. 8 illustrates another preferred embodiment method for utilizing the apparatus of FIG. 1, in flow diagram form.

FIG. 8 illustrates a preferred embodiment method for utilizing the apparatus 100 of the present invention, in flow diagram form. In the embodiment of FIG. 8, the apparatus 100 of the present invention can be utilized in order to provide information regarding an individual involved in a transaction to another individual, an entity, a merchant, a vendor, or a provider.

The embodiment of FIG. 8 will be described as being utilized in order to provide information regarding an individual involved in a transaction. The embodiment of FIG. 8 can be utilized in a same, in a similar, and/or in an analogous manner, in order to provide any one or more of the information described herein about or regarding an individual involved in a transaction.

The embodiment of FIG. 8 will be described as being utilized in connection with a credit card account or the charge card account which the individual has presented for payment in order to provide information regarding the individual involved in a transaction. The embodiment of FIG. 8 can also be utilized in a same, in a similar, and/or in an analogous manner, in order to provide information regarding the individual involved in a transaction involving any one or more of the herein-described credit accounts, charge accounts, debit card accounts, debit accounts, checking accounts, bank accounts, automated teller machine accounts, savings accounts, brokerage accounts, pension accounts, individual retirement accounts (IRAs), self-employed pension (SEP) accounts, "smart" card accounts, currency card accounts, healthcare accounts, Medicare accounts, Medicaid accounts, employee benefits accounts, cafeteria accounts, spending accounts, subscription accounts for any good(s), product(s), or service(s), insurance accounts, healthcare insurance accounts, prescription drug insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, renter's insurance accounts, casualty insurance accounts, property insurance accounts, ticket accounts, telephone calling card accounts, utility accounts, electrical utility accounts, gas utility accounts, fuel oil utility accounts, financial accounts, electronic money accounts, electronic cash accounts, communication accounts, telephone accounts, wireless communication device accounts, non-wireless communication device accounts, cellular communication device accounts, cellular communication accounts, Internet accounts, Internet service provider accounts, electronic mail (e-mail) accounts, accounts associated with, or corresponding to, an electronic signature, a membership account, a club membership account, an entertainment membership account, or an entertainment tickets account, sports tickets accounts, theatre tickets accounts, concert or opera tickets accounts, consumer or purchaser membership accounts, sports club membership accounts, health club membership accounts, merchant credit accounts for a customer, merchant accounts, association membership accounts, professional association membership accounts, trade association membership accounts, or any plan or program associated with, or corresponding to any of the above accounts, or accounts which correspond to, which are associated with, which are identified with, or which are otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program, and/or other accounts.

With reference to FIG. 8, the operation of the apparatus 100 commences at step 800. At step 801, an individual, entity, merchant, vendor, or provider (hereinafter "merchant"), who is engaged in a transaction with an individual, can access the central processing computer 10 via a merchant computer 20.

At step 801, the merchant can access the central processing computer 10 and enter information regarding the individual, the transaction, or information regarding the credit card account or the charge card account, or other account, which the individual has presented for payment, into the merchant computer 20 associated with the merchant. The information can, for example, be entered into a transaction authorization device which can be utilized as a merchant computer 20. At step 802, the information entered into the merchant computer 20, at step 801, is transmitted to the central processing computer 10.

At step 803, the central processing computer 10 will receive the information. At step 804, the central processing computer 10 will process the information received, at step 803, in conjunction with the information stored in the database 10H. At step 804, the central processing computer 10 will generate an individual information report.

The individual information report can contain any of the herein-described information which is stored in the database 10H. The individual information report can, for example, contain information regarding the number and frequency of charge-backs which have occurred on a credit card account or charge card account of the individual, the reasons for the charge-back action, allegations made by the individual, dispute allegations made by the individual, allegations of fraudulent or unauthorized account activity made by individual, the basis for any of the above-described allegations, allegations or responses made by the merchants, vendors, or providers, involved in the transactions in question, transactions amounts involved, probability or statistical information regarding whether the individual can be a charge-back risk in the present transaction, and/or any other information regarding charge-back(s) which have occurred on the respective account or involving the individual, which can or which may be useful to and/or may be of interest to a merchant, vendor, or provider, in assessing whether or not the individual may present a charge-back risk.

The individual information report can also contain unpaid bill information and/or history, loan repayment information and/or history, mortgage repayment information and/or history, loan delinquency information and/or history, loan default information and/or history, repossession information and/or history, foreclosure information and/or history, credit score information and/or history, credit rating information and/or history, changes in credit score or credit rating information and/or history, loans originated information and/or history, loans satisfied and/or paid off information and/or history, credit account or credit card and/or charge account or charge card bills paid and/or payments made information and/or history, minimum balance payment information and/or history, bill paid in full payment information and/or history, time to pay in full a balance or a loan information and/or history, credit account, credit card account, charge account, or charge card account, credit limit information and/or history, credit account, credit card account, charge account, or charge card account, credit interest and/or interest changes information and/or history, charge-back information and/or history for or involving any number of accounts, stopping of payment information and/or history involving any number of accounts, non-payment due to insufficient funds and/or checks bounced information and/or history involving any number of accounts, loan application information and/or history, credit account or credit card account application information and/or history, charge account or charge card account application information and/or history, debit account or debit card account application information and/or history, or co-applicant, co-party, or co-signer, information or history for, regarding, or involving, a loan, credit account, credit card account, charge account, charge card account, debit account, or debit card account, for, involving, or associated with, the individual.

The individual information report can also contain any one or more of information regarding a criminal record, including, but not limited to, information regarding a traffic infraction(s), violation(s), misdemeanor(s), or felony or felonies, conviction(s), guilty plea(s), plea bargain(s), arrest warrant(s) issued and/or arrest warrant(s) outstanding, of, for, regarding, or involving, the individual. The individual information report can also contain information regarding a judgment(s) issued against or involving, a judgment(s) satisfied involving, or an unsatisfied judgment(s) involving, an individual, for, of, associated with, or regarding, the individual.

The individual information report can also contain information regarding information which is missing and/or not available at the time of report generation.

The individual information report can also contain any of the herein-described information which is stored in the database 10H. The individual information report can, for example, also contain information regarding the number and frequency of respective stopping of payment(s) or non-payment(s) due to insufficient funds which have occurred on an account, the reasons for the respective stopping of payment(s) or non-payment(s) due to insufficient funds, allegations made by the individual, dispute allegations made by the individual, allegations of fraudulent or unauthorized account activity made by the individual, the basis for any of the above-described allegations, allegations or responses made by the merchants, vendors, or providers, involved in the transactions in question, transactions amounts involved, probability or statistical information regarding whether the account holder or account owner can be a respective stopping of payment(s) risk or non-payment(s) due to insufficient funds risk in the present transaction, and/or any other information regarding respective stopping of payment(s) or non-payment(s) due to insufficient funds which have occurred on the respective account, which can or which may be useful to and/or of interest to a merchant, vendor, or provider, in assessing whether or not the individual may present a respective stopping of payment(s) risk or non-payment(s) due to insufficient funds risk.

The individual information can also contain information regarding information which is missing and/or not available at the time of report generation.

In this regard, the apparatus 100 and method of the present invention can provide a wide variety of information regarding an individual involved in a transaction to a respective merchant, vendor, or provider, of a good, product, or service.

At step 805, the central processing computer 10 can transmit the individual information report to the merchant computer 20. The individual information report can also be transmitted to the merchant or to the merchant computer 20 as any one or more of an e-mail message, an instant messaging message, a short message, a beeper message, a pager message, a telephone message, a recorded voice message, and/or any other electronic message or electronic transmission.

At step 806, the merchant computer 20 can receive the individual information report.

At step 807, the information provided and/or contained in the individual information report can be displayed to the merchant or the merchant's employee or agent, can be output or printed out, and/or can otherwise be provided to the merchant or the merchant's employee or agent.

At step 808, the merchant or the merchant's employee or agent can review the information contained in the individual information report and determine whether or not to proceed to engage in the transaction with the individual, to proceed to process the transaction, to proceed to consummate the transaction, or to cancel the transaction. In this manner, for example, a merchant can be apprised of any of the herein-described information regarding the individual engaged in the transaction.

The merchant can then utilize the report information in order to determine either not to proceed with the transaction, to cancel the transaction or order, to request additional information, to request information to confirm and/or verify the transaction and the individual's authority to enter into the transaction, to request additional assurances from the individual, to secure the individual's agreement not to dispute a charge or payment, to secure the individual's agreement not to stop payment for a charge or payment, to secure individual's guarantee that sufficient funds exist to cover a payment, to secure the individuals alternate agreement to guarantee payment for a charge, to secure a release of liability or claim from the individual regarding the transaction, and/or the merchant can take any other action in order to protect its interests.

Thereafter, the operation of the apparatus 100 will cease at step 809.

In this regard, the apparatus 100 and method of the present invention can also be utilized to provide information regarding an individual, currently engaging in a transaction or otherwise, to a merchant, vendor, or provider.

In a same, similar, and/or analogous, manner, the preferred embodiment of FIG. 8 can also be utilized in connection with a transaction involving a credit account, a charge account, a debit card account, a debit account, a bank account, a checking account, an automated teller machine account, a savings account, a brokerage account, a pension account, an individual retirement account (IRA), a self-employed pension (SEP) account, a "smart" card account, a currency card account, a healthcare account, a Medicare account, a Medicaid account, an employee benefits account, a cafeteria account, a spending account, a subscription account for any good(s), product(s), or service(s), an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, an electronic mail (e-mail) account, an account associated with, or corresponding to, an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, a trade association membership account, or any plan or program associated with, or corresponding to any of the above accounts, or an account which corresponds to, which is associated with, which is identified with, or which is otherwise related to, a liability insurance policy, plan, or program, a vehicle insurance policy, plan, or program, a homeowner insurance policy, plan, or program, a general liability insurance policy, plan, or program, a casualty insurance policy, plan, or program, a property insurance policy, plan, or program, a flood insurance policy, plan, or program, a hurricane insurance policy, plan, or program, a lease insurance policy, plan, or program, a renter's insurance policy, plan, or program, a healthcare insurance policy, plan, or program, a prescription drug insurance policy, plan, or program, a life insurance policy, plan, or program, a disability insurance policy, plan, or program, an employee benefits plan, a cafeteria plan or program, a spending plan or program, a tuition or tuition reimbursement plan or program, a ticket plan or program, a telephone calling card plan or program, a utility plan or program, an electrical utility plan or program, a gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, an Internet plan or program, an Internet service provider plan or program, or any other type or kind of insurance policy, plan, or program, associated therewith or corresponding thereto, or any other policy, plan, or program.

In another preferred embodiment, the apparatus and method of the present invention can be utilized in conjunction with, and/or along with, a transaction authorization process involving any of the herein-described accounts, plans, policies, or programs.

In any and/or all of the embodiments described herein, the apparatus 100 or the central processing computer 10 can be programmed to automatically generate, and/or to automatically transmit to the merchant computer 20, a new or updated charge-back information report or new or updated charge-back information reports, within the merchant-defined time limit or time period or the provider-defined time limit or time period, upon detecting or determining that new information, previously unavailable information, or missing information, is, or has been made, available in the database 10H. In this regard, the merchant or the provider can be automatically provided with one or more new or updated charge-back information reports within or during the merchant-defined time limit or time period or the provider-defined time limit or time period, or prior to or before a date and/or time for a providing, a shipping, a transferring, and/or a delivery, of a good(s), product(s), or service(s).

In any and/or all of the embodiments described herein, the apparatus 100 or the central processing computer 10 can also be programmed to automatically generate, and/or to automatically transmit to the merchant computer 20, a new or updated stopping of payment(s) information report or a new or updated non-payment(s) due to insufficient funds information report, or new or updated stopping of payment(s) information reports or new or updated non-payment(s) due to insufficient funds information reports, within the merchant-defined time limit or time period or the provider-defined time limit or time period, upon detecting or determining that new information, previously unavailable information, or missing information, is, or has been made, available in the database 10H. In this regard, the merchant or the provider can be automatically provided with one or more new or updated stopping of payment(s) information reports or with one or more new or updated non-payment(s) due to insufficient funds information reports within or during the merchant-defined time limit or time period, or prior to or before a date and/or time for a providing, a shipping, a transferring, and/or a delivery, of a good(s), product(s), or service(s).

In any and/or all of the embodiments described herein, the apparatus 100 or the central processing computer 10 can also be programmed to automatically generate, and/or to automatically transmit to the merchant computer 20, a new or updated information report, containing any of the information herein-described as being provided by the apparatus 100 and method of the present invention, within a merchant-defined time limit or time period, within a vendor-defined time limit or time period, or within a provider-defined time limit or time period, upon detecting or determining that new information, previously unavailable information, or missing information, is, or has been made, available in the database 10H. In this regard, the merchant, vendor, or provider, can be automatically provided with one or more new or updated information reports within or during the merchant-defined time limit or time period, the vendor-defined time limit or time period, or the provider-defined time limit or time period, or prior to or before a date and/or time for a providing, a shipping, a transferring, and/or a delivery, of a good(s), product(s), or service(s).

In another preferred embodiment, as well as in any of the embodiments described herein, intelligent agents, software agents, mobile agents, and/or related technologies, can be utilized in conjunction with the present invention. The respective intelligent agent(s), software agent(s), mobile agent(s), (hereinafter referred to collectively as "intelligent agent" or "intelligent agents") can be programmed and/or designed to act on behalf of any of the respective merchants, vendors, or providers, described herein as utilizing the apparatus 100 of the present invention, so as to act on behalf of the respective merchants, vendors, or providers, as well as to perform any of processing functions and/or other functions described herein.

The intelligent agent can act on behalf of the respective individuals, entities, merchants, vendors, or providers, in various activities which are described as being performed herein and/or which may be incidental and/or related thereto. Therefore, the present invention also provides an agent-based apparatus and method for providing transaction history information, account history information, and/or charge-back information, or individual information, or any of the other information described herein which can be provided by the apparatus and method of the present invention.

Applicant hereby incorporates by reference herein the subject matter of the Agent Sourcebook, A Complete Guide to Desktop, Internet and Intranet Agents, by Alper Caglayan and Colin Harrison, Wiley Computer Publishing, 1997. Applicant also incorporates by reference herein the subject matter of Cool Intelligent Agents For The Net, by Leslie L. Lesnick with Ralph E. Moore, IDG Books Worldwide, Inc. 1997.

The apparatus of the present invention, in any and/or all of the embodiments described herein, can also be programmed to be self-activating and/or activated automatically.

While the present invention has been described and illustrated in various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

What is claimed is:

1. A computer-implemented method, comprising:
processing, with a processing device, information regarding an account involved in a transaction involving an individual;
generating, with the processing device, a report or a message in response to the processing of the information regarding the account, wherein the report or the message contains information regarding a charge-back regarding a previous transaction involving the account; and transmitting, with or from a transmitter, the report or the message to a communication device associated with a merchant, a vendor, or a provider, of a good, a product, or a service.

2. The computer-implemented method of claim 1, wherein the account is a healthcare account, a Medicare account, a Medicaid account, an employee benefits account, a cafeteria account, a spending account, a subscription account for a good, product, or service, an insurance account, a healthcare insurance account, a prescription drug insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a renter's insurance account, a casualty insurance account, a property insurance account, a ticket account, a telephone calling card account, a utility account, an electrical utility account, a gas utility account, a fuel oil utility account, a financial account, an electronic money account, an electronic cash account, a communication account, a telephone account, a wireless communication device account, a non-wireless communication device account, a cellular communication device account, a cellular communication account, an Internet account, an Internet service provider account, or an electronic mail (e-mail) account.

3. The computer-implemented method of claim 1, wherein the account is an account associated with an electronic signature, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for a customer, a merchant account, an association membership account, a professional association membership account, or a trade association membership account, or wherein the account is an account associated with a policy, a plan, or a program.

4. The computer-implemented method of claim 1, wherein the charge-back regarding a previous transaction involves the individual involved in the transaction.

5. The computer-implemented method of claim 1, wherein the communication device is a transaction authorization device.

6. The computer-implemented method of claim 1, wherein the communication device is a wireless device, a wireless telephone, or a personal digital assistant.

7. The computer-implemented method of claim 1, wherein the account is a credit card account, a credit account, a charge card account, a charge account, a debit card account, or a debit account.

8. The computer-implemented method of claim 1, further comprising:
    determining whether the transaction is authorized or not authorized;
    generating a second report or a second message containing information regarding whether the transaction is authorized or not authorized; and
    transmitting the second report or the second message to the communication device.

9. The computer-implemented method of claim 1, wherein the information regarding the account includes information regarding a time period or a time limit relating to, or a time of, a providing, a shipment, a transfer, or a delivery, of a good, a product, or a service, pursuant to the transaction, and further wherein the report or the message is transmitted to the communication device prior to the providing, the shipment, the transfer, or the delivery, of the good, the product, or the service.

10. The computer-implemented method of claim 1, wherein the report or the message is transmitted to the communication device prior to a providing, a shipment, a transfer, or a delivery, of a good, a product, or a service, or the report or the message is transmitted to the communication device prior to a processing, a completion, a consummation, or a cancellation, of the transaction.

11. The computer-implemented method of claim 1, wherein the report or the message is transmitted to the communication device pursuant to, in, or during, a transaction authorization process.

12. The computer-implemented method of claim 1, wherein the transaction is an on-line transaction or an Internet transaction, and further wherein the information regarding the transaction, or the report or the message, is transmitted via, on, or over, the Internet or the World Wide Web.

13. The computer-implemented method of claim 1, further comprising:
    generating, with the processing device, a new or updated report or a new or updated message, wherein the new or updated report or the new or updated message contains new or updated information; and
    transmitting, with or from the transmitter, the new or updated report or the new or updated message to the communication device associated with a merchant, vendor, or provider, of a good, product, or service, within or during a pre-defined time limit or time period, or prior to or before a date or a time for a providing, a shipping, a transferring, or a delivery, of a good, product, or service pursuant to the transaction.

14. The computer-implemented method of claim 1, wherein the report or the message contains unpaid bill information or history, loan repayment information or history, mortgage repayment information or history, loan delinquency information or history, loan default information or history, repossession information or history, foreclosure information or history, credit score information or history, credit rating information or history, changes in credit score or credit rating information or history, loans originated information or history, loans satisfied or paid off information or history, credit account or credit card or charge account or charge card bills paid or payments made information or history, minimum balance payment information or history, bill paid in full payment information or history, time to pay in full a balance or a loan information or history, credit account, credit card, charge account, or charge card, credit limit information or history, credit account, credit card, charge account, or charge card, credit interest or interest changes information or history, charge-back information or history for or involving any number of accounts, stopping of payment information or history involving any number of accounts, non-payment due to insufficient funds or checks bounced information or history involving any number of accounts, loan application information or history, credit account or credit card account application information or history, charge account or charge card account application information or history, debit account or debit card account application information or history, or co-applicant, co-party, or co-signer, information or history for, regarding, or involving, a loan, credit account, credit card account, charge account, charge card account, debit account, or debit card account, for, involving, or associated with, the individual.

15. The computer-implemented method of claim 1, wherein the report or the message contains information regarding a criminal record, a traffic infraction, violation, misdemeanor, or felony, conviction, a guilty plea, a plea bargain, an arrest warrant issued or an arrest warrant outstanding, of, for, regarding, or involving, the individual, or the report or the message contains information regarding a judgment issued against or involving, a judgment satisfied involving, or an unsatisfied judgment involving, the individual.

16. The computer-implemented method of claim 1, wherein the transaction is a telephone transaction, an on-line transaction, or a mail order transaction.

17. The computer-implemented method of claim 1, further comprising:
   processing information regarding a second transaction involving the individual or a second transaction involving a second individual;
   generating a second report or a second message, wherein the second report or the second message contains information regarding a stopping of a payment regarding or involving the individual or regarding or involving the second individual, or information regarding a non-payment due to insufficient regarding or funds regarding or involving the involving the second individual; and
   transmitting the second report or the second message to the communication device or to a second communication device.

18. A computer-implemented method, comprising:
   processing, with a processing device, information regarding an account involved in a transaction involving an individual;
   generating, with the processing device, a report or a message in response to the processing of the information regarding the account, wherein the report or the message contains information regarding a previous transaction involving the account;
   transmitting, with or from a transmitter, the report or the message to a communication device associated with a merchant, a vendor, or a provider, of a good, a product, or service;
   determining whether a transaction involving the account is authorized or not authorized;
   generating a second report or a second message containing information regarding whether the transaction is authorized or not authorized; and
   transmitting the second report or the second message to the communication device.

19. The computer-implemented method of claim 18, wherein the account is a healthcare account, a healthcare insurance account, or a prescription drug insurance account.

20. An apparatus, comprising:
   a processing device, wherein the processing device processes information regarding an account involved in a transaction involving an individual, wherein the processing device generates a report or a message in response to the processing of the information regarding the account, wherein the report or the message contains information regarding a previous transaction involving the account; and
   a transmitter, wherein the transmitter transmits the report or the message to a communication device associated with a merchant, vendor, or provider, of a good, product, or service.

21. The apparatus of claim 20, wherein the apparatus processes information for determining whether the transaction is authorized or not authorized, and further wherein the apparatus generates a second report or a second message containing information regarding whether the transaction is authorized or not authorized, and further wherein the transmitter of the apparatus transmits the second report or the second message to the communication device.

22. The apparatus of claim 20, wherein the report or the message contains information regarding a charge-back involving the account or a charge-back regarding the previous transaction.

23. The apparatus of claim 20, wherein the account is a healthcare account, a healthcare insurance account, or a prescription drug insurance account.

* * * * *

(12) INTER PARTES REVIEW CERTIFICATE (3548th)

United States Patent (10) Number: US 9,715,691 K1
Joao (45) Certificate Issued: Apr. 4, 2024

(54) APPARATUS AND METHOD FOR PROVIDING TRANSACTION HISTORY INFORMATION, ACCOUNT HISTORY INFORMATION, AND/OR CHARGE-BACK INFORMATION

(75) Inventor: Raymond Anthony Joao

(73) Assignee: CASELAS, LLC

Trial Number:

IPR2021-00799 filed Apr. 15, 2021

Inter Partes Review Certificate for:

Patent No.: 9,715,691
Issued: Jul. 25, 2017
Appl. No.: 12/802,973
Filed: Jun. 17, 2010

The results of IPR2021-00799 are reflected in this inter partes review certificate under 35 U.S.C. 318(b).

INTER PARTES REVIEW CERTIFICATE
U.S. Patent 9,715,691 K1
Trial No. IPR2021-00799
Certificate Issued Apr. 4, 2024

AS A RESULT OF THE INTER PARTES REVIEW PROCEEDING, IT HAS BEEN DETERMINED THAT:

Claims 1-23 are cancelled.

\* \* \* \* \*